United States Patent
Zeng et al.

(10) Patent No.: US 12,271,417 B2
(45) Date of Patent: Apr. 8, 2025

(54) MULTI-IMAGE SEARCH

(71) Applicant: Google LLC, Mountain View, CA (US)

(72) Inventors: Belinda Luna Zeng, Cupertino, CA (US); Harshit Kharbanda, Pleasanton, CA (US); Christopher James Kelley, Orinda, CA (US); Erica Bjornsson, Kentfield, CA (US); David William Hendon, Oakland, CA (US)

(73) Assignee: GOOGLE LLC, Mountain View, CA (US)

( * ) Notice: Subject to any disclaimer, the term of this patent is extended or adjusted under 35 U.S.C. 154(b) by 73 days.

(21) Appl. No.: 18/305,660

(22) Filed: Apr. 24, 2023

(65) Prior Publication Data

US 2024/0354332 A1    Oct. 24, 2024

(51) Int. Cl.
| | | |
|---|---|---|
| *G06F 16/532* | (2019.01) | |
| *G06F 16/538* | (2019.01) | |
| *G06F 16/55* | (2019.01) | |
| *G06F 16/583* | (2019.01) | |
| *G06V 10/22* | (2022.01) | |
| *G06V 10/26* | (2022.01) | |
| *G06V 10/75* | (2022.01) | |
| *G06V 10/764* | (2022.01) | |

(52) U.S. Cl.
CPC .......... *G06F 16/532* (2019.01); *G06F 16/538* (2019.01); *G06F 16/55* (2019.01); *G06F 16/5846* (2019.01); *G06V 10/235* (2022.01); *G06V 10/267* (2022.01); *G06V 10/751* (2022.01); *G06V 10/764* (2022.01)

(58) Field of Classification Search
CPC ...... G06F 16/532; G06F 16/538; G06F 16/55; G06F 16/5846; G06V 10/235; G06V 10/267; G06V 10/751; G06V 10/764
See application file for complete search history.

(56) References Cited

U.S. PATENT DOCUMENTS

| | | | | |
|---|---|---|---|---|
| 10,810,252 | B2* | 10/2020 | Kerr | G06N 3/08 |
| 11,163,819 | B2* | 11/2021 | Canelis | G06F 3/04845 |
| 11,297,027 | B1* | 4/2022 | Agrawal | H04L 51/52 |
| 2004/0267740 | A1* | 12/2004 | Liu | G06F 16/5862 |
| 2022/0012297 | A1* | 1/2022 | Basu | G06N 3/045 |
| 2023/0418861 | A1* | 12/2023 | Zhang | G06F 16/535 |

(Continued)

OTHER PUBLICATIONS

Qasim Iqbal et al., "Feature Integration, Multi-image Queries and Relevance Feedback in Image Retrieval", 6th International Conference on Visual Information Systems (Visual 2003), Miami, Florida, Sep. 24-26, 2003, pp. 467-474 (Year: 2003).*

(Continued)

*Primary Examiner* — Jared M Bibbee
(74) *Attorney, Agent, or Firm* — DORITY & MANNING P.A.

(57) ABSTRACT

Systems and methods for multi-image search can include obtaining two or more images and determining one or more search results that are based on the two or more images. The one or more search results can be determined based on determined shared attributes of the two or more images. The one or more search results may be based on feature embeddings associated with the two or more images. The two or more images may be obtained based on one or more user interactions with one or more databases.

19 Claims, 14 Drawing Sheets

(56) References Cited

U.S. PATENT DOCUMENTS

2023/0419571 A1* 12/2023 Zhang ............... G06T 11/203
2024/0004924 A1*  1/2024 Zhang ............... G06F 16/532

OTHER PUBLICATIONS

Jiann-Jone Chen et al., "The System of Multi-Instance Image Query with Heterogeneous Features", IEEE, pp. 1-4 (Year: 2006).*
International Search Report and Written Opinion for Application No. PCT/US2024/023702, mailed Jul. 15, 2024, 15 pages.
Iqbal et al., "Feature Integration, Multi-image Queries and Relevance Feedback in Image Retrieval", Computer and Vision Research Center, 6th International Conference on Visual Information Systems, Sep. 24- 26, 2003, Miami, FL, 8 pages.

* cited by examiner

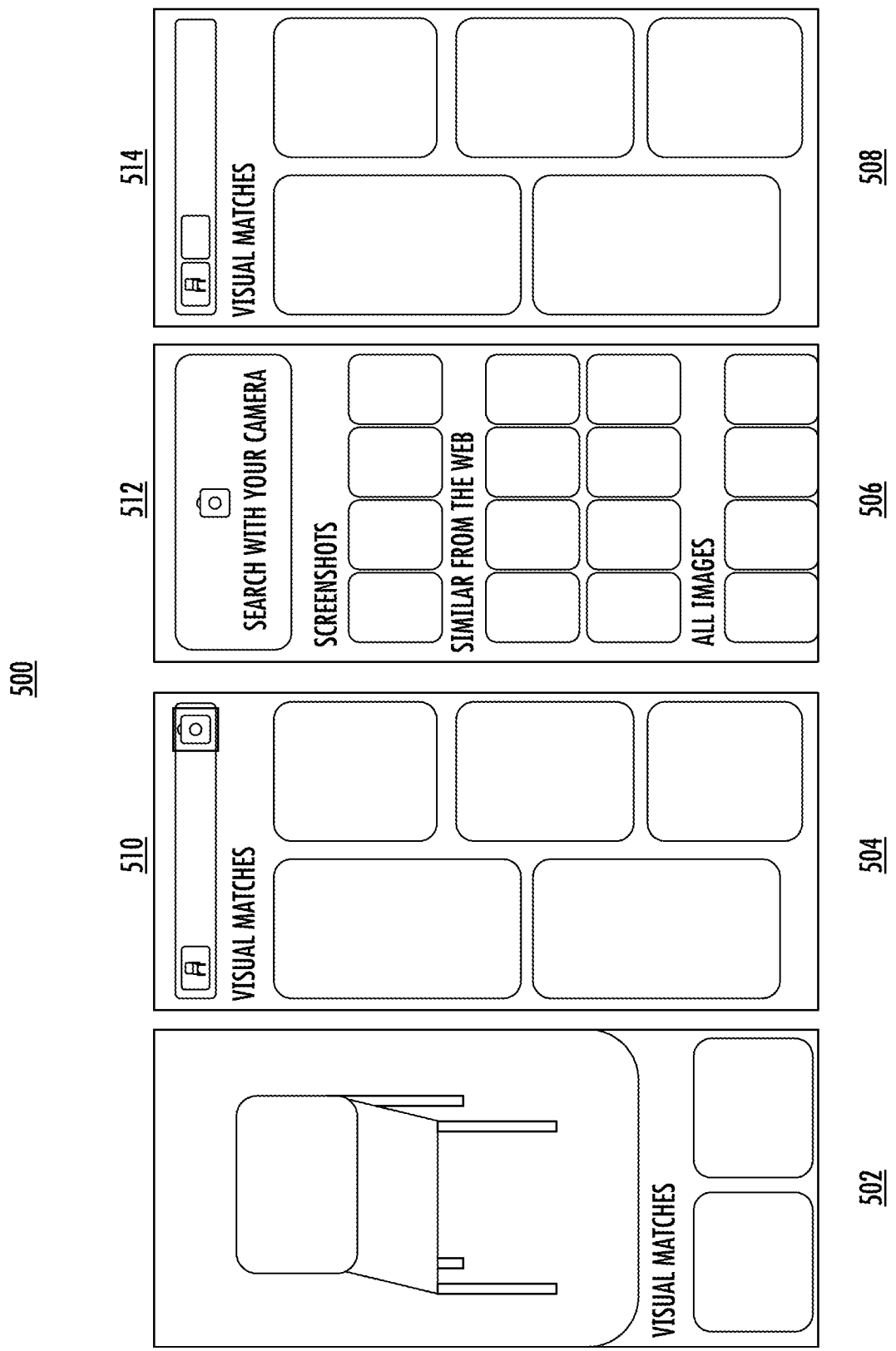

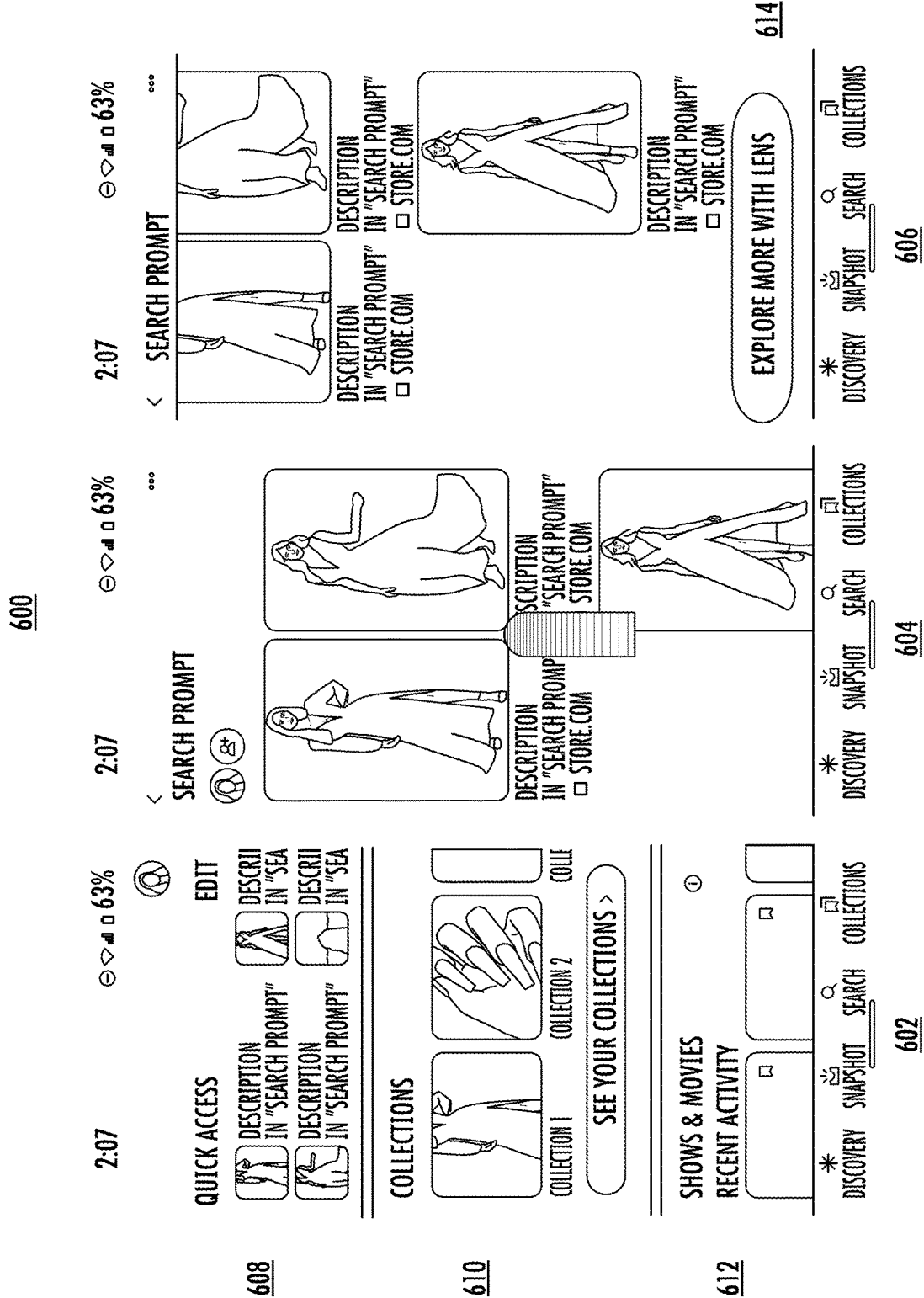

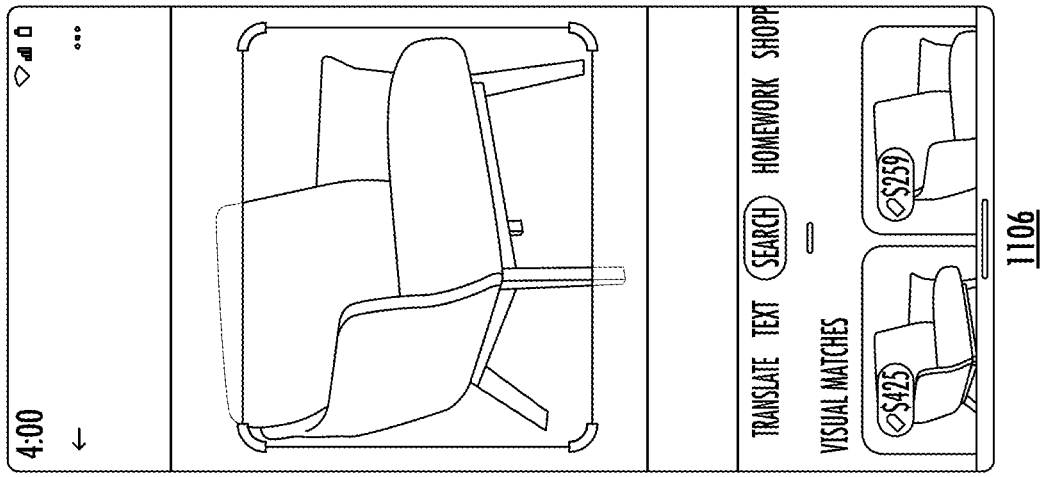
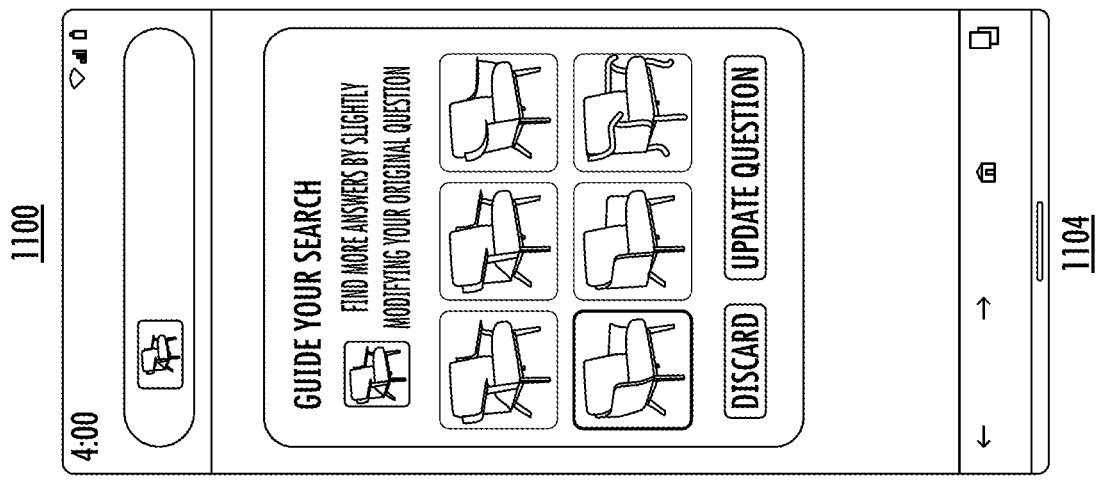
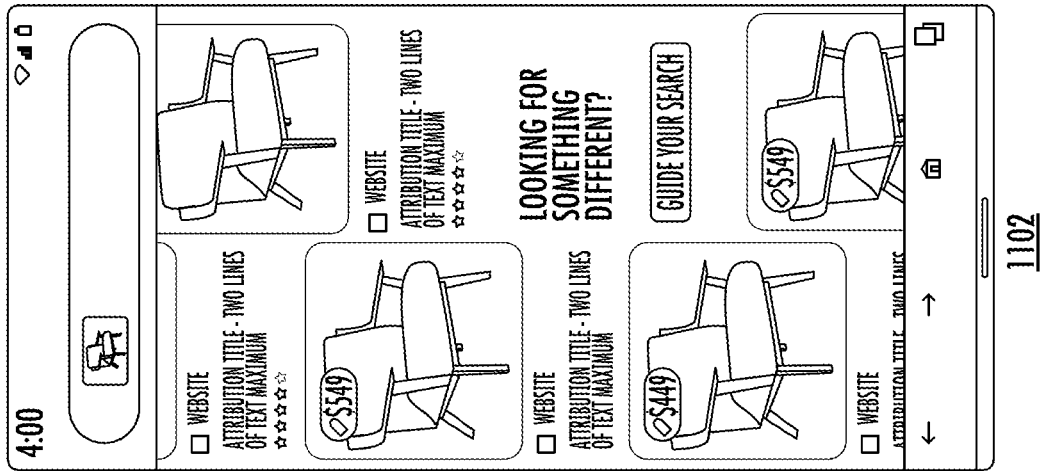
FIG. 11

MULTI-IMAGE SEARCH

FIELD

The present disclosure relates generally to multi-image search. More particularly, the present disclosure relates to obtaining two or more images and performing a search based on two or more images such that the one or more search results are associated with two or more images.

BACKGROUND

Understanding the world at large can be difficult. Whether an individual is trying to understand what the object in front of them is, trying to determine where else the object can be found, and/or trying to determine where an image on the internet was captured from, text searching alone can be difficult. In particular, users may struggle to determine which words to use. Additionally, the words may not be descriptive enough and/or abundant enough to generate desired results.

In addition, the content being requested by the user may not be readily available to the user based on the user not knowing where to search, based on the storage location of the content, and/or based on the content not existing. The user may be requesting search results based on an imagined concept without a clear way to express the imagined concept.

Traditional image search with a single image may lead to an overfocus on identifying search results that match the image of the query, which can limit the discovery of similar alternatives. Additionally, the search may identify and provide for display search results associated with features of the image that are not important to a user (e.g., A user may be attempting to find similar dresses as the one worn by the celebrity in the image, and the search results may include other images of that celebrity and/or other images of the depicted location.).

SUMMARY

Aspects and advantages of embodiments of the present disclosure will be set forth in part in the following description, or can be learned from the description, or can be learned through practice of the embodiments.

One example aspect of the present disclosure is directed to a computing system for searching with multiple images. The system can include one or more processors and one or more non-transitory computer-readable media that collectively store instructions that, when executed by the one or more processors, cause the computing system to perform operations. The operations can include obtaining a search query. The search query can include a first image and a second image. The operations can include processing the first image and the second image to determine one or more shared attributes. The first image can be associated with the one or more shared attributes. In some implementations, the second image can be associated with the one or more shared attributes. The operations can include determining one or more search results based at least in part on the one or more shared attributes. The one or more search results can be determined to be associated with the one or more shared attributes. The operations can include providing the one or more search results in a search results interface.

Another example aspect of the present disclosure is directed to a computer-implemented method for searching with multiple images. The method can include obtaining, by a computing system including one or more processors, a first image and a second image. The method can include processing, by the computing system, the first image with an embedding model to generate a first embedding. The first embedding can be associated with an embedding space. The method can include processing, by the computing system, the second image with the embedding model to generate a second embedding. In some implementations, the second embedding can be associated with the embedding space. The method can include determining, by the computing system, one or more search results based on the first embedding and the second embedding. The one or more search results can be associated with one or more search result embeddings. The method can include providing, by the computing system, the one or more search results for display in a search results interface.

Another example aspect of the present disclosure is directed to one or more non-transitory computer-readable media that collectively store instructions that, when executed by one or more computing devices, cause the one or more computing devices to perform operations. The operations can include obtaining a first image query. The first image query can include first image data. The operations can include determining a first set of search results based on the first image data. The first set of search results can include a plurality of first image search results. The operations can include providing the first set of search results for display in a search results interface. The operations can include obtaining a selection of a particular first image search result of the plurality of first image search results. The particular first image search result can be associated with second image data. In some implementations, the first image data and the second image data can differ. The operations can include determining a second set of search results based on the first image data and the second image data and providing the second set of search results for display in the search results interface.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 5 depicts an illustration of an example multi-image search system with image capture according to example embodiments of the present disclosure.

FIG. 6 depicts an illustration of an example collections interface according to example embodiments of the present disclosure.

FIG. 11 depicts an illustration of an example guided search system according to example embodiments of the present disclosure.

Figure 1:
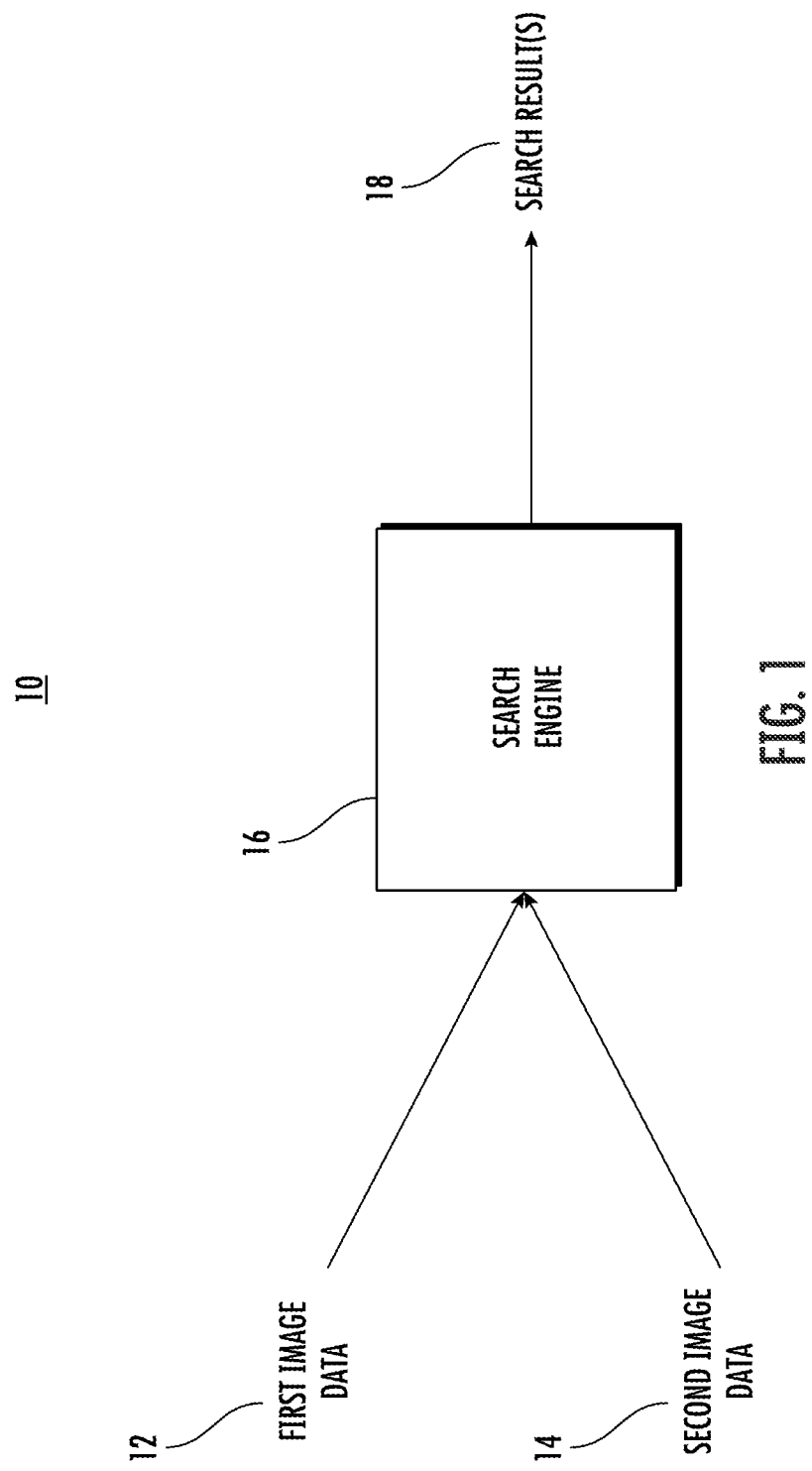
FIG. 1 depicts a block diagram of an example multi-image search system according to example embodiments of the present disclosure.

Reference numerals that are repeated across plural figures are intended to identify the same features in various implementations.

DETAILED DESCRIPTION

Generally, the present disclosure is directed to systems and methods for multi-image search. In particular, the systems and methods disclosed herein can process a multi-image search query, determine an intent of the multi-image query, and determine search results based on the determination. The intent determination can include determining shared attributes between a first image and a second image, determining a projected direction of search refinement, determining image relationships, determining the multi-image query is an ensemble request, determining the multi-image query is requesting a particular feature be included, determining the multi-image query is requesting a particular feature not be included, and/or determining a style and/or aesthetic.

Image search with a single image can lead to an overfocus on identifying search results that match the image of the query, which can limit the discovery of similar alternatives (e.g., single image searching may prioritize exact image matching over providing a diverse array of search results that may include alternatives and/or inspirational images). Additionally, the search may identify and provide for display search results associated with features of the image that are not important to a user (e.g., A user may be attempting to find similar chairs as the one displayed in the user-captured image of the dentist waiting room, and the search results may include other images of that dental office and/or other images of the other furniture types in the user-captured image.).

By obtaining and processing multiple images, the systems and methods disclosed herein can determine a search intent of a user that can be utilized to determine search results that are responsive to the intent, directed, and diverse past image matching alone. In particular, the systems and methods may include determining shared attributes of input images, which can be utilized to condition the search based on identifying search results associated with the particular shared attribute(s). Alternatively and/or additionally, the systems and methods may embed each of the input images and may then utilize the image embeddings to determine the one or more search results, which can provide for a feature-aware search that can be based on the provided images in combination. In some implementations, the multi-image search query can include text data and/or selection data that can be processed to determine whether a user is requesting a particular detail be included, whether a user is requesting a particular detail be absent, and/or whether to search for an ensemble of a first detail associated with a first image and a second detail associated with a second image.

The systems and methods for multi-image search may leverage attribute determination, embedding based search, search refinement, multimodal search, and/or interaction based search to provide search results that can provide suggestions, inspiration, and/or insight.

For example, two or more images (e.g., a first image associated with first image data and a second image associated with second image data) can be obtained and processed to determine one or more shared attributes for the two or more images. Search results can then be determined based on the shared attributes. The shared attributes may include text labels, metadata, visual features, object and/or image classifications, and/or a shared entity association. In some implementations, the text labels can be obtained from a web resource, from image metadata, and/or from machine-learned model processing (e.g., the image may be processed to determine one or more text labels associated with the image). One or more of the images may be cropped before processing. The cropping can be based on a user selection of a portion of the image and/or based on one or more machine-learned model detections and/or classifications.

The search results interface that displays the determined search results may include user interface elements that indicate the determined shared attributes. The user interface elements associated with the text labels can be selectable to refine the search to obtain additional search results associated with that particular shared attribute.

In some implementations, the shared attributes can include shared visual features. The shared visual feature determination may be performed by one or more machine-learned models.

Alternatively and/or additionally, the multi-image search can include an embedding based search. For example, a first image and a second image can be obtained and processed with an embedding model to generate a respective first embedding and a respective second embedding. Search results can then be determined based on the first embedding and the second embedding.

In some implementations, a third embedding in the embedding space may be determined based on the first embedding and the second embedding. The third embedding can then be utilized to determine the one or more search results. The third embedding may be an embedding average between the first embedding and the second embedding. In some implementations, the third embedding may be a weighted average of the first embedding and the second embedding. The weighting can be based on user input, time of interaction with each particular image, age of the images, quality of the images, and/or order of the images. Alternatively and/or additionally, the third embedding may be based on a projection prediction associated with an embedding change from the first embedding to the second embedding (e.g., the change trend can be utilized to generate the predicted third embedding).

The search results may be determined by one or more embedding nearest neighbor determinations. Alternatively and/or additionally, the search results may be determined based on the first embedding and the second embedding being associated with one or more learned distributions of the embedding space.

The multi-image search may be a product of a refinement and/or adjustment to an initial search. For example, a first search may be performed based on a first image query to determine a first set of search results. An image result of the first set of search results can be selected to refine the search, and a second set of search results can be determined based on both the first image query and the selected image search result. The second set of search results may be determined based on a determination of one or more shared attributes associated with the first image query and the selected image search result. The selection of the particular image search result may include an optional cropping interface for a user to indicate which portion of the image is descriptive of features to be processed.

In some implementations, the particular image search result may be selected as a request for absence of one or more particular details (e.g., the image is off topic or does not include what the user wants). The search results can be redetermined, refined/pruned, and/or reranked based on the absence request.

Additionally and/or alternatively, the second set of search results may be obtained based on the first image query and ranked based on the second image query, or vice versa.

In some implementations, the search results interface can include thumbnail versions of the first image query and/or the second image query (e.g., the selected image search result) in a query input box of the search results interface.

The multi-image search may be performed automatically as a suggestion tool (and/or a discovery tool). For example, the multi-image search can be based on images interacted with by the user and/or images in a collection associated with a user (e.g., images stored in a database associated with a user). In particular, a search may be performed based on interactions with two or more images in one or more applications. The two or more images may be stored locally and/or on a server computing system based on the interactions. The interactions can include saving the image, "liking" the image, "sharing" the image, generating the image (e.g., the image is generated using a generative model), and/or a viewing time (e.g., a user viewed the image for more than a threshold amount of time). Additionally and/or alternatively, the one or more applications can include browser applications, search applications, social media applications, etc. The search may be performed automatically without prompting to provide one or more suggested images, links, etc.

Additionally and/or alternatively, the multi-image search can be utilized for ensemble search (e.g., searching for a combination of details (e.g., a combination of objects, patterns, and/or styles)). For example, a first image may be selected for a first particular feature, and a second image may be selected for a second particular feature. A search can be performed to identify search results that are associated with both the first particular feature and the second particular feature. The first particular feature may be associated with a particular clothing item, and the second particular feature may be associated with a particular pattern. Alternatively and/or additionally, the first image feature may be associated with a particular object, and the second image feature may be associated with a particular pattern, color, texture, accessory, and/or other detail. Each image may be associated with one or more other inputs that are associated with the particular feature (e.g., a bounding box, a text input, and/or a region selection). In some implementations, the second image may be a negative image to not include search results associated with the second particular feature.

The systems and methods of the present disclosure provide a number of technical effects and benefits. As one example, the systems and methods can provide a search system that can receive multiple image inputs and output search results that are responsive to the combination of image inputs. In particular, the systems and methods disclosed herein can provide a search system that identifies a key point of user interest based on the input images and provide search results responsive to the image. The search results can be identified based on the determined user interest.

Another technical benefit of the systems and methods of the present disclosure is the ability to leverage image embeddings to determine a direction and/or projection of a user's search. For example, the input images may be processed with an embedding model to generate a respective image embedding for each particular image. The image embeddings may be associated with a shared learned distribution. The search may be performed based at least in part on the properties associated with the learned distribution. Alternatively and/or additionally, the embeddings may be averaged to determine an average embedding that may be utilized for search (e.g., the k-nearest neighbors of the average embedding may be determined to be search results). The average embedding may be generated based on a weighted average that includes weights based on one or more contexts (e.g., order of image selection, quality of image, user text data, sources of the images, etc.). Alternatively and/or additionally, a first image may be utilized for a first search that resulted in the second image being displayed and selected. The systems and methods disclosed herein may determine vector values descriptive of the difference between the first image embedding and the second image embedding with the delta being the magnitude and the direction being the translational path from the first image embedding to the second image embedding. The vector values can then be utilized to generate a third embedding that continues the trend displayed based on the changes from the first image embedding to the second image embedding. The third embedding may then be searched.

Another example of technical effect and benefit relates to improved computational efficiency and improvements in the functioning of a computing system. For example, the systems and methods disclosed herein can leverage shared attribute determination and/or determined embedding relationships to determine improved and/or refined search results, which can decrease the volume of searches performed for each user instance. The decrease in the volume of searches can reduce the computational resources used by the user.

In some implementations, the shared attribute determination and/or the embedding of the images may be performed locally on the user computing system and can then be transmitted to the search computing system. The localized determination and/or generation can reduce the computational cost that is involved in transmitting large image files over a network.

With reference now to the Figures, example embodiments of the present disclosure will be discussed in further detail.

FIG. 1 depicts a block diagram of an example multi-image search system 10 according to example embodiments of the present disclosure. In some implementations, the multi-image search system 10 is configured to receive, and/or obtain, a set of input data descriptive of first image data 12 and second image data 14 and, as a result of receipt of the input data, generate, determine, and/or provide output data that can include one or more search results 18. Thus, in some implementations, the multi-image search system 10 can include a search engine 16 that is operable to identify content items and/or web resources associated with the first image data 12 and the second image data 14.

In particular, FIG. 1 depicts a multi-image search system 10 that obtains first image data 12 and second image data 14, which can then be processed with a search engine 16 to determine one or more search results 18 responsive to the multi-image search query. The first image data 12 can be descriptive of a first image from a first resource, and the second image data 14 may be descriptive of a second image from a second resource. The first resource and the second resource may differ. In some implementations, the first resource and the second resource may be the same resource. The first image data 12 and second image data 14 may be stored locally and/or may be stored by a server computing system. The first image data 12 and the second image 14 may depict different objects, patterns, colors, and/or other details and/or may depict the same or similar objects, patterns, colors, and/or other details.

The search engine 16 may be a general search engine, a specialized search engine, a public search engine, a private search engine, a closed loop search engine, and/or a web search engine. The search engine 16 may perform image matching, feature matching, label recognition and search, embedding based search, metadata based search, and/or one or more other search techniques. In some implementations, the search engine 16 may additionally process one or more additional datasets with the first image data 12 and the second image data 14. The one or more additional datasets can include text data (e.g., text descriptive of how to process the first image data 12 and/or the second image data 14), selection data (e.g., a selection input associated with a specific portion of the first image and/or the second image to process), audio data (e.g., audio descriptive of a voice command), statistical data, user profile data, latent encoding data, and/or trend data. The search engine 16 may include and/or receive data from one or more machine-learned models.

The one or more search results 18 can include search results associated with both the first image data 12 and the second image data 14. The association can include an association with an image that shares attributes with both the first image data 12 and the second image data 14. Alternatively and/or additionally, the one or more search results 16 can specifically include one or more attributes of the first image data 12 and specifically not include one or more attributes of the second image data 14 based on one or more user inputs. In some implementations, the one or more search results 18 may be identified based on the first image data 12 and ranked based on the second image data 14, or vice versa.

The one or more search results 18 can then be provided to a user via a search results interface, a discovery interface, a suggestions interface, a shopping interface, a viewfinder interface, and/or via one or more other mediums. In some implementations, the one or more search results 18 may be provided for display with a thumbnail of the respective image of the resource that was identified to be associated with the first image data 12 and the second image data 14.

Figure 2:
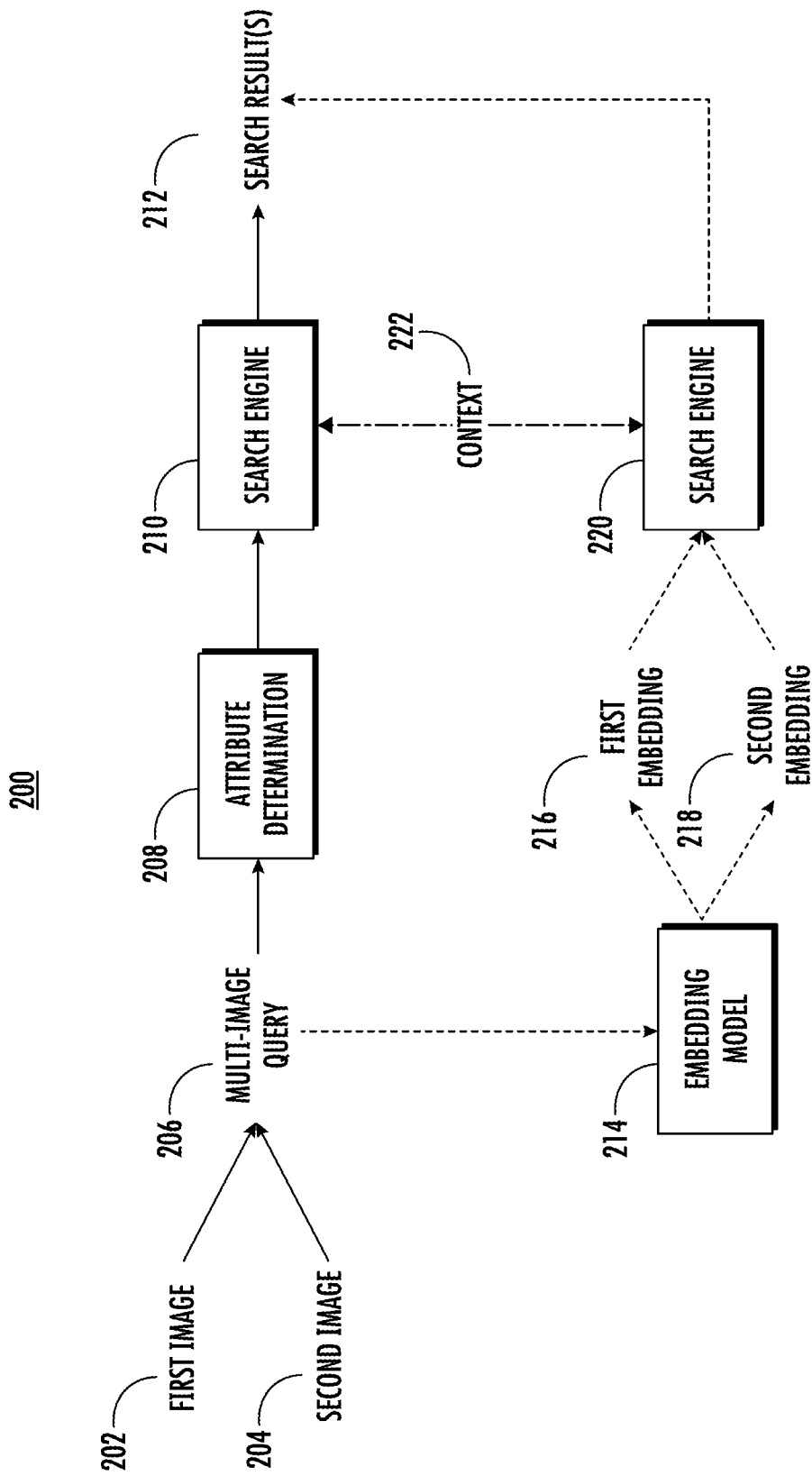
FIG. 2 depicts a block diagram of an example multi-image processing and search system according to example embodiments of the present disclosure.

FIG. 2 depicts a block diagram of an example multi-image processing and search system 200 according to example embodiments of the present disclosure. The multi-image processing and search system 200 is similar to multi-image search system 10 of FIG. 1 except that multi-image processing and search system 200 further includes attribute determination 208.

In particular, FIG. 2 depicts a multi-image processing and search system 200 that may determine one or more search results for a multi-image query 206 based on attribute determination 208 and/or based on one or more embeddings.

For example, a first image 202 and a second image 204 may be obtained to generate a multi-image query 206 that can be received for searching. The first image 202 and the second image 204 may be obtained from the different and/or the same databases and may depict different objects and/or scenes with one or more shared details.

Performing a search for the multi-image query 206 can include processing the multi-image query 206 with an attribute determination block 208 to determine one or more shared attributes and/or one or more differing attributes. The determined one or more shared attributes and/or the determined one or more differing attributes may be utilized to determine the one or more search results 212. For example, the attribute data (e.g., data descriptive of the shared attribute determination and/or the differing attribute determination) may be processed with a search engine 210 to identify the one or more search results 212. Alternatively and/or additionally, a plurality of candidate search results for the first image 202 and a plurality of candidate search results for the second image 204 may be identified, and the attribute data may be utilized to re-rank, refine, and/or prune the identified candidate results to increase the rankings of identified candidate results that include shared attributes and/or do not include differing attributes. In some implementations, the identified candidate results can be refined (and/or pruned) to remove candidate results that do not include the shared attribute.

The search engine 210 may process the first image 202 and the second image 204 with the attribute data and/or may process the attribute data individually. In some implementations, the first image 202 and/or the second image 204 may be augmented (e.g., cropped) based on the attribute data. The augmented image(s) can then be processed with the search engine 210 to determine the one or more search results 212. In some implementations, the search engine 210 may additionally process context data 222 that may provide additional context associated with the user, the particular search instance, the first image 202, the second image 204, and/or search trends.

Alternatively and/or additionally, the multi-image processing and search system 200 may include embedding based search. For example, the multi-image query 206 including the first image 202 and the second image 204 can be processed with an embedding model 214 to generate a first embedding 216 associated with the first image 202 and a second embedding 218 associated with the second image 204. The first embedding 216 and the second embedding 218 can be processed with a search engine 220 to determine at least a subset of the one or more search results 212. In some implementations, an aggregated similarity score for each candidate search result embedding can be determined. The aggregated similarity score can be determined based on a first similarity score between the first embedding 216 and the candidate search result embedding and a second similarity score between the second embedding 218 and the candidate search result embedding. The aggregated similarity score can then be utilized to determine the one or more search results, which may include ranking the candidate search results based on the aggregated similarity scores. Alternatively and/or additionally, the one or more search results 212 may be determined and/or refined based on the first embedding 216 and/or the second embedding 218 being associated with one or more shared learned distributions.

In some implementations, a third embedding may be determined based on the first embedding 216 and the second embedding 218. The third embedding may be an embedding average of the first embedding 216 and the second embedding 218. The embedding average may be a weighted embedding based on context data 222, which may be associated with text data, selection data, user data, image metadata, and/or other context data. Alternatively and/or additionally, the third embedding may be a projection prediction based on a predicted trend from the first embedding 216 to the second embedding 218. The third embedding may be an embedding similar to a first embedding 216 and dissimilar from the second embedding 218 based on a user input requesting results dissimilar to the second image 204.

The third embedding and/or the context data 222 may be processed by the search engine 220 to determine at least a subset of the one or more search results 220.

The search engine 210 and the search engine 220 may differ and/or may be the same search engine. In some implementations, the one or more search results 212 can include both attribute based search results and embedding based search results. In some implementations, the one or more search results 212 may be identified based on the attribute data and refined based on the embedding data. Alternatively and/or additionally, the one or more search results 212 may be identified based on the embedding data and may be ranked based on the attribute data.

Figure 3:
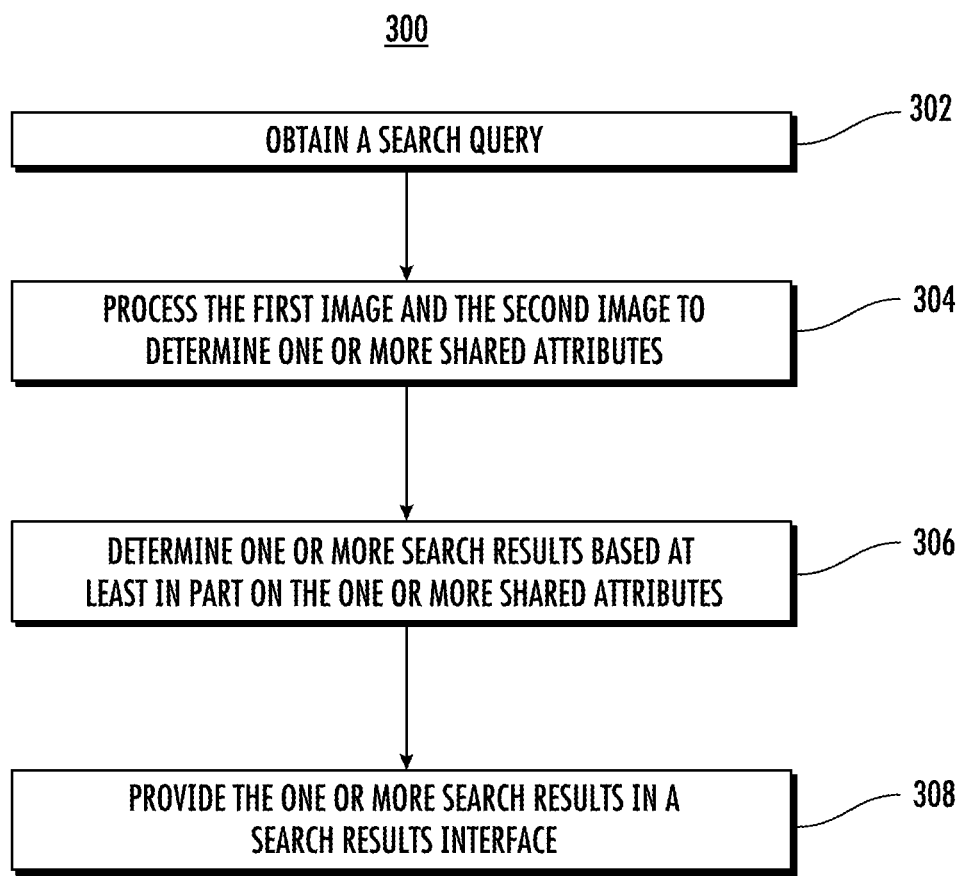
FIG. 3 depicts a flow chart diagram of an example method to perform multi-image attribute based search according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain a search query. The search query can include a first image and a second image. The search query can be a multimodal query that may include both text data and image data. The text data may be descriptive of particular objects and/or portions of the image data to process for the search (e.g., "find the table design of the first image with the wood finish of the second image"). In some implementations, the search query can include metadata associated with the first image and/or the second image. The metadata can be descriptive of a time, a location, an entity associated with the image, a description, a web page associated with the image, and/or other metadata. The search query may include text data, image data, audio data, latent encoding data, and/or other data. The first image and the second image may be images generated and/or captured by a user device, may be obtained from a web resource, and/or may be associated with a user computing system and/or server computing system. The first image and the second image may be from different sources (e.g., the first image may be obtained from a user's local storage, and the second image may be obtained from a social media platform). Alternatively and/or additionally, the first image and the second image may be obtained from the same resource. In some implementations, the first image may be a pre-existing image (e.g., an image captured and stored locally on a user device, an image obtained from a web page and stored, and/or an image received via an email attachment), and the second image may be a model-generated image that was generated by processing a prompt with a generative text-to-image model. One or more of the images may be cropped before processing. The cropping can be based on a user selection of a portion of the image and/or based on one or more machine-learned model detections and/or classifications.

At 304, the computing system can process the first image and the second image to determine one or more shared attributes. The first image can be associated with the one or more shared attributes, and the second image can be associated with the one or more shared attributes. The shared attributes may include text labels, metadata, visual features, object and/or image classifications, and/or a shared entity association.

In some implementations, the one or more shared attributes can include one or more text labels. The one or more text labels can be obtained from a web resource associated with at least one of the first image or the second image. Alternatively and/or additionally, the one or more text labels can be determined based on first metadata for the first image and second metadata for the second image. A search results interface can include one or more user interface elements including one or more words descriptive of the one or more text labels. In some implementations, the computing system can obtain a selection of a particular user interface element of the one or more user interface elements, obtain one or more additional search results based on a particular text label associated with the particular user interface element, and provide the one or more additional search results for display in the search results interface.

Alternatively and/or additionally, processing the first image and the second image to determine one or more shared attributes can include processing the first image and the second image with one or more machine-learned models to determine one or more matching visual features. The one or more shared attributes can include one or more matching visual features.

In some implementations, processing the first image and the second image to determine one or more shared attributes can include processing the first image with one or more classification models to determine a first set of classifications. The first set of classifications can include one or more first object classifications. Processing the first image and the second image to determine one or more shared attributes may include processing the second image with the one or more classification models to determine a second set of classifications. The second set of classifications can include one or more second object classifications. The first set of classifications and the second set of classifications can then be compared to determine one or more similar classifications. The one or more shared attributes can be associated with the one or more similar classifications.

At 306, the computing system can determine one or more search results based at least in part on the one or more shared attributes. The one or more search results can be determined to be associated with the one or more shared attributes. The one or more search results may be determined based on determining the one or more search results are associated with one or more images that include the shared attribute. In some implementations, the one or more search results can be determined by determining images associated with the first image and/or determining images associated with the second image, and then refining the identified images based on the determined shared attribute. For example, a first set of search results may be determined based on the first image, and the first set of search results can then be refined (e.g., reranked and/or pruned) based on the determined shared attribute(s).

At 308, the computing system can provide the one or more search results in a search results interface. The one or more search results may be provided in a grid, in a list, in a carousel, in a pull-up tab, in a pop-up, and/or in panels (e.g., aligned panels and/or offset panels). The search results interface may include one or more user interface elements that indicate the one or more shared attributes (e.g., a text display descriptive of the shared attribute(s) and/or image annotations (e.g., bounding boxes and/or highlights)). In some implementations, the search results interface may include a selectable user interface element to generate a model-generated image. Alternatively and/or additionally, the search query may be processed with a generative model to generate one or more model-generated images that are provided for display in the search results interface. The one or more model-generated images can be provided adjacent to the one or more search results. Alternatively and/or additionally, the one or more model-generated images may be provided in a separate panel of the search results interface.

In some implementations, the computing system can obtain a user input that selects a portion of the first image and can generate an augmented first image. The first augmented image can be generated by cropping the first image based on the user input. Additionally and/or alternatively, the one or more search results can be determined based at least in part on the augmented first image.

In some implementations, the computing system can obtain a user input that selects a portion of the second image and can generate an augmented second image. The second augmented image can be generated by generating one or more segmentation masks based on the user input and segmenting one or more regions of the second image based on the one or more segmentation masks. The one or more segmentation masks can be generated based on a determined outline associated with one or more detected objects associated with the user input (e.g., an object proximate to a location of a user selection). The one or more search results can then be determined based at least in part on the augmented second image.

Figure 4A:
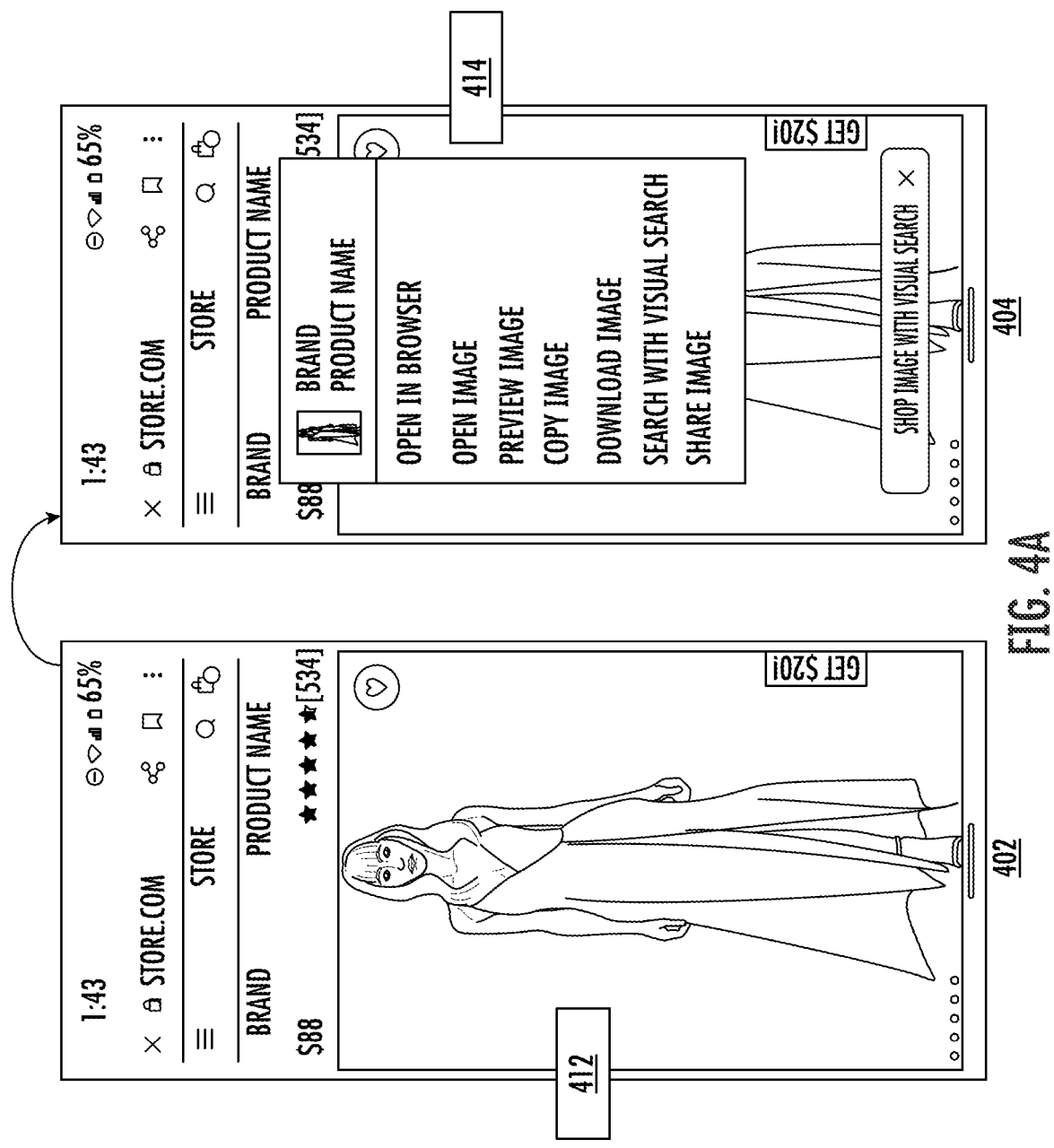
FIG. 4A depicts an illustration of an example image interaction according to example embodiments of the present disclosure.
Figure 4B:
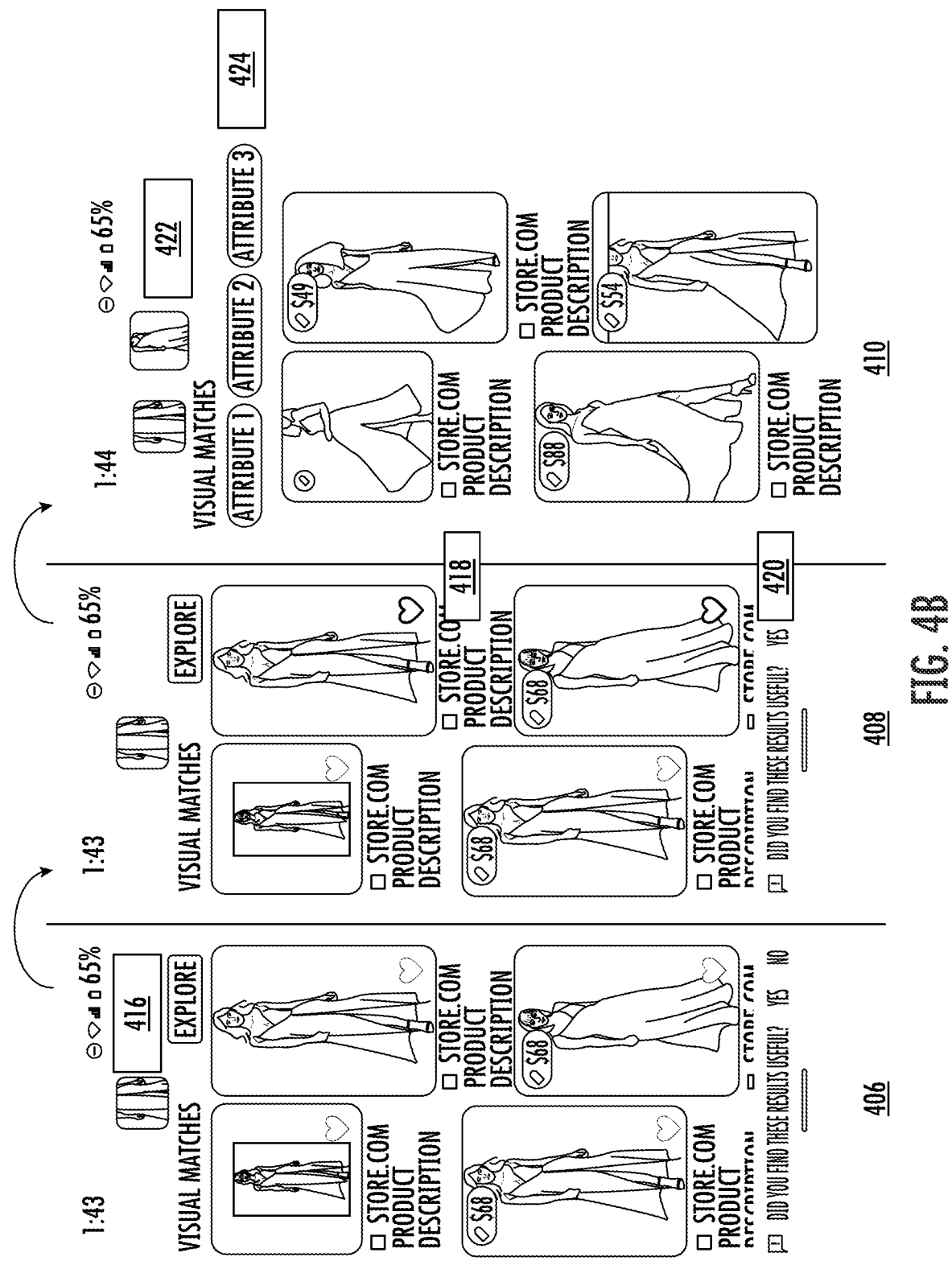
FIG. 4B depicts an illustration of an example search results interface according to example embodiments of the present disclosure.

FIGS. 4A & 4B depict an example search interface 400 according to example embodiments of the present disclosure. The example search interface 400 can include an entry point for users to perform visual searches on images in one or more applications, which may include a browser application, a shopping application, a social media application, a messaging application, an image gallery application, a discovery application, a music application, a video player application, and/or one or more other applications. For example, a user may be browsing a web page, select an image, and select the search entry point as displayed in FIGS. 4A & 4B.

FIG. 4A depicts an illustration of an example image interaction according to example embodiments of the present disclosure. In particular, at 402, a web page is provided for display, in which the web page includes an image 412. The user can interact with the image 412 to open an interaction options interface 414. At 404, the interaction options interface 414 is provided for display overlayed over the web page. The interaction options interface 414 can include a plurality of options, which can include open the image 412 in a browser, open the image 412 in an image application, preview the image, copy the image, download the image, share the image, favorite the image, and/or search with visual search. The user may select the "search with visual search" option to open the search interface to perform a visual search on the image 412.

FIG. 4B depicts an illustration of an example search results interface according to example embodiments of the present disclosure. In particular, the image 412 of FIG. 4A may be processed with a search engine to determine a first set of search results, which can be displayed in a search results interface. At 406, a search results interface is provided for display that includes at least a subset of the first set of search results. The search results interface can include a thumbnail 416 of the image 412 provided for display in a header of the search results interface.

At 408, the user may interact with a second image 418 and/or a third image 420. The interaction can include the selection of one or more user interface elements (e.g., selecting a search icon, a favorite icon, a download icon, and/or a hot key selection). The second image 418 and/or the third image 420 may then be searched to determine a second set of search results. In some implementations, the second image 418 and/or the third image 420 may be searched with the first image 412. Alternatively and/or additionally, the second set of search results may be a refined version of the first set of search results, in which the refinement is based at least in part on features associated with the second image 418 and/or features associated with the third image 420.

At 410, at least a subset of the second set of search results can be provided for display in the search results interface. In some implementations, the search results interface can include thumbnails 422 depicting the images of the multi-image query. Additionally and/or alternatively, one or more shared attributes for the first image 412, the second image 418, and/or the third image 420 may be determined. The shared attributes may be associated with a text label, an object classification, and/or a feature label. One or more user interface elements 424 (e.g., one or more text tiles) can then be generated and provided for display in the search results interface. The one or more user interface elements 424 can be descriptive of the shared attributes. In some implementations, the one or more user interface elements 424 may be selectable to further refine the search to focus on that particular shared attribute.

FIG. 5 depicts an illustration of an example multi-image search system 500 with image capture according to example embodiments of the present disclosure. The multi-image search system 500 may include an initial visual search interface 502 for viewing an image and providing initial search results. The user may pull-up on the visual search results panel to expand the visual search results panel (e.g., as shown in 504). The expanded visual search results interface can depict a thumbnail of the initial image query in a query input box 510 with an option to select an additional image query to further refine the visual search results. The user may select the option to open an image selection interface 506 that may include an image capture interface 512 (e.g., the user may be able to capture an image of their environment with a camera associated with the user computing device) adjacent to screenshots, similar images from the web, and/or all user images for selection.

An image may be captured and/or selected, and a visual search can be performed on the initial image query and the selected image to determine an updated set of search results.

The updated set of search results can then be provided in the visual search results interface (e.g., as shown in 508). The updated search results interface may depict thumbnails of each image in the multi-image query in the query input box 514.

FIG. 6 depicts an illustration of an example collections interface 600 according to example embodiments of the present disclosure. In some implementations, the visual search may be performed and/or provided as an option in a collections interface 600. For example, at 602, a user may scroll through a quick access panel 608 associated with quick access images and links, a collections panel 610 associated with different collections (e.g., different image and link collections generated by a user), and a shows and movies panel 612 associated with movies and shows a user has interacted with based on a viewing history and/or an interaction history.

A user may select a particular collection to view. At 604, the images and/or links associated with the selected collection are provided for display. The collection may include user selected content items (e.g., links and/or images), may include model-generated images (e.g., images generated with a generative model that may process text data and/or image data to generate the model-generated content item), and may include suggested content items (e.g., content items suggested based on other content items in the collection). A user may scroll through the collection to view the different content items.

At 606, the collections interface 600 includes an "explore" user interface element 614 for searching for other content items. The user may select the "explore" user interface element 614 to search for other content items, which may then be added to the collection. Selecting the "explore" user interface element 614 can cause a visual search on at least a portion of the content items of the collection to be performed. In some implementations, the user may select which images to utilize in the multi-image query. Alternatively and/or additionally, the multi-image query may be generated automatically based on determined similarities, based on associated embeddings, and/or based on one or more other groupings. In some implementations, the multi-image query may include data associated with all content items in the collection.

Figure 7:
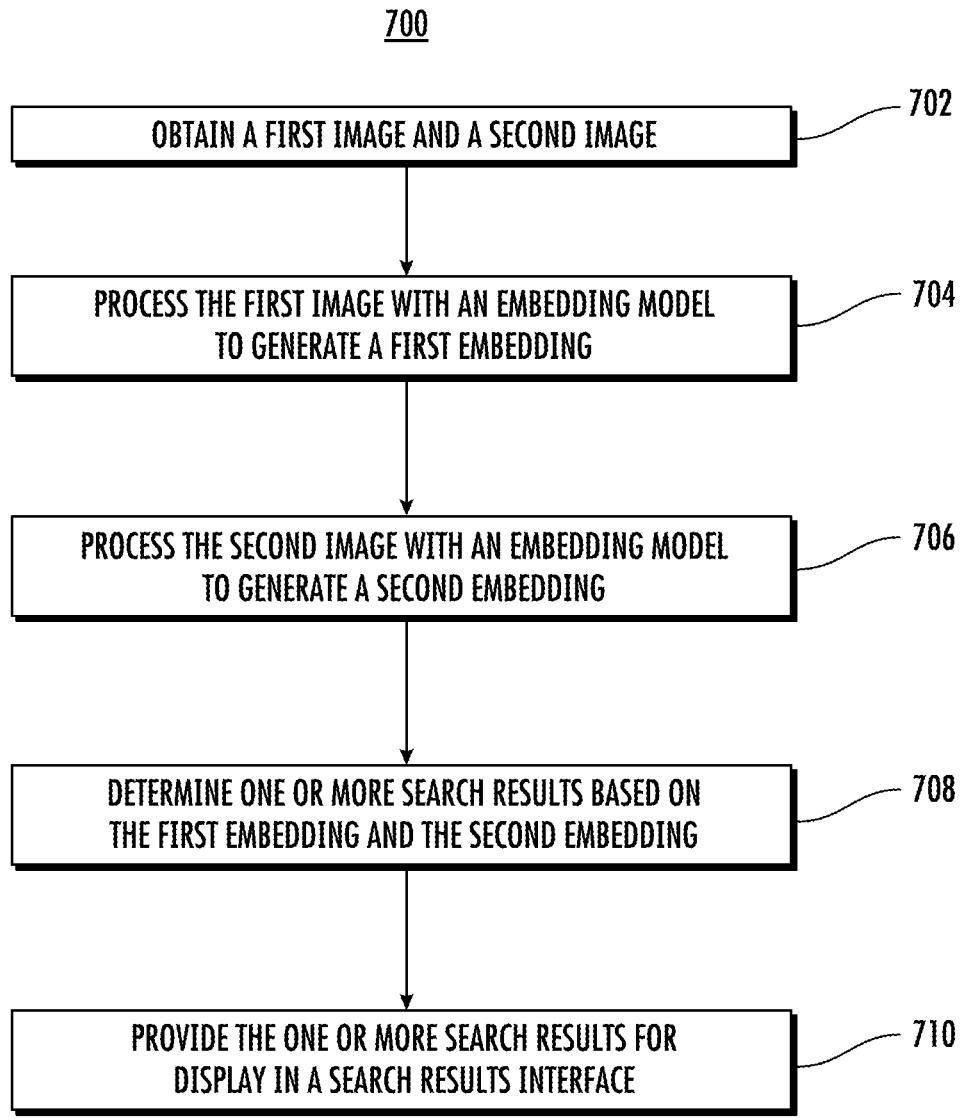
FIG. 7 depicts a flow chart diagram of an example method to perform multi-image embedding based search according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a first image and a second image. The first image and the second image can be descriptive of different objects. In some implementations, the depicted objects may share one or more details. For example, the first image may depict a first object, and the second image may depict a second object. The first object and the second object may be associated with a same and/or similar object type, pattern, accessory, texture, aesthetic, and/or style. The first image and the second image may be obtained from the same resource or may be obtained from different resources.

At 704, the computing system can process the first image with an embedding model to generate a first embedding. The first embedding can be associated with an embedding space. The first embedding can be descriptive of image features associated with the first image. The embedding model can be a machine-learned model trained to process images and generate embeddings descriptive of the features in the respective image. The embedding model may be trained to generate similar embeddings for images depicting similar objects, patterns, style, and/or aesthetics.

At 706, the computing system can process the second image with the embedding model to generate a second embedding. The second embedding can be associated with the embedding space. The second embedding can be descriptive of image features associated with the second image. The first embedding and/or the second embedding may be associated with one or more learned distributions associated with one or more learned properties. One or more labels may be associated with the first image and/or the second image based on the association with the one or more learned distributions.

At 708, the computing system can determine one or more search results based on the first embedding and the second embedding. The one or more search results can be associated with one or more search result embeddings. The one or more search results embeddings may be associated with a learned distribution that additionally includes the first embedding and/or the second embedding. The one or more search result embeddings may be similar to and/or proximate to the first embedding and/or the second embedding.

In some implementations, the computing system can determine a third embedding based on an average of the first embedding and the second embedding. Determining the one or more search results based on the first embedding and the second embedding can include determining the one or more search results embeddings are associated with the third embedding. The third embedding can be generated based on a weighted average of the first embedding and the second embedding. One or more weights for the weighted average can be determined based on context data associated with at least one of the first image or the second image. Additionally and/or alternatively, the context data can include time data associated with a respective first time associated with the first image and a respective second time associated with the second image.

In some implementations, the computing system can obtain first time data associated with the first image and second time data associated with the second image. The first time data can be descriptive of a first user interaction time with the first image, and the second time data may be descriptive of a second user interaction time with the second image. The computing system can determine the first user interaction time is earlier than the second user interaction time. Additionally and/or alternatively, the computing system can determine a third embedding based on the first embedding, the second embedding, and the determination that the first user interaction time is earlier than the second user interaction time. Determining the one or more search results based on the first embedding and the second embedding can include determining the one or more search results embeddings are associated with the third embedding. The third embedding can be determined based on a determined projection from the first embedding to the second embedding. For example, the third embedding can be associated with a continuation of the determined projection.

At 710, the computing system can provide the one or more search results for display in a search results interface. The one or more search results may be ranked and/or ordered based on similarity score between the respective search result embedding and the first embedding and/or the second embedding. The similarity score may be a weighted score. In some implementations, the one or more search results may be provided in response to respective search result embedding(s) having a threshold similarity score to both image embeddings.

Figure 8:
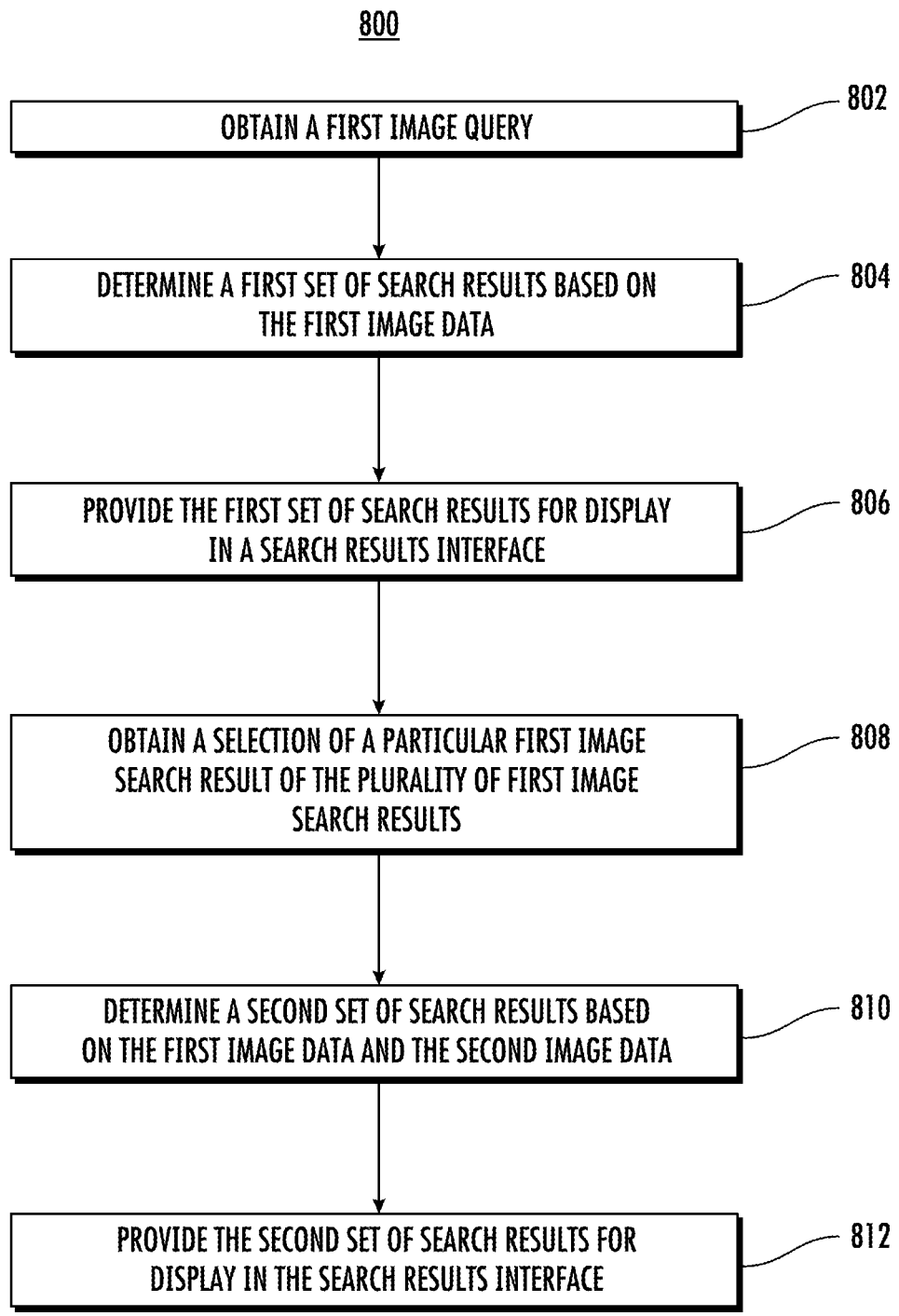
FIG. 8 depicts a flow chart diagram of an example method to perform multi-image search refinement according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a first image query. The first image query can include first image data. The first image data may include one or more images. In some implementations, the first image data can include image metadata. The first image query may be obtained via a viewfinder application, via overlay application, and/or based on one or more interactions with a first image. The first image query may be associated with a first image generated with a user device and/or a first image obtained from one or more databases. The first image query may be provided with additional data, which may include text data, audio data, and/or latent encoding data.

At 804, the computing system can determine a first set of search results based on the first image data. The first set of search results can include a plurality of first image search results. The first set of search results may be determined based on image matching, feature recognition, label determination and search, embedding nearest neighbor search, and/or one or more other search techniques.

At 806, the computing system can provide the first set of search results for display in a search results interface. The search results interface may display the first set of search results in a first panel and may display a thumbnail of the first image in a query input box. The first set of search results may be provided with one or more user interface elements for interacting with images associated with the respective search results. The interaction options can include saving, favoriting, "liking", searching, and/or viewing additional information associated with the respective image search result.

At 808, the computing system can obtain a selection of a particular first image search result of the plurality of first image search results. The particular first image search result can be associated with second image data. The first image data and the second image data may differ. The selection can be associated with a request for an absence of one or more particular details. In some implementations, the second image data can include the one or more particular details. The second set of search results can be descriptive of a plurality of second image search results that comprise one or more objects associated with the first image data without the one or more particular details of the second image data.

At 810, the computing system can determine a second set of search results based on the first image data and the second image data. The second set of search results can be determined based on a particular attribute. The first image data can be descriptive of the particular attribute. In some implementations, the second image data can be descriptive of the particular attribute. The particular attribute may include one or more visual features.

At 812, the computing system can provide the second set of search results for display in the search results interface. The second set of search results may be displayed where the first set of search results were previously displayed. In some implementations, the search results interface may display thumbnails associated with the first image data and the second image data in a query input box.

Figure 9:
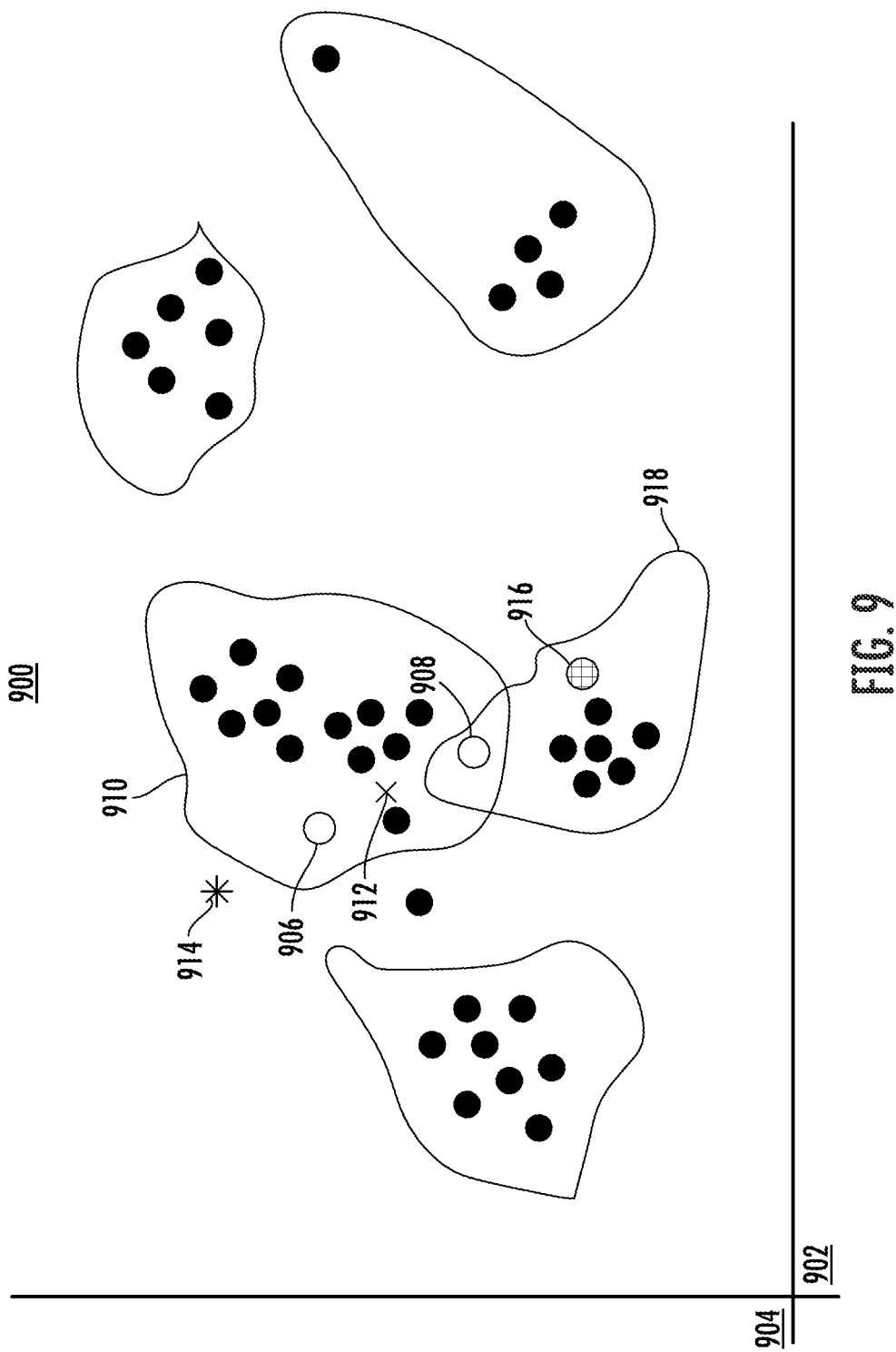
FIG. 9 depicts an illustration of an example embedding space according to example embodiments of the present disclosure.

FIG. 9 depicts an illustration of an example embedding space 900 according to example embodiments of the present disclosure. The embedding space 900 depicted in FIG. 9 includes a first axis 902 (e.g., an x-axis) and a second axis 904 (e.g., a y-axis) that are associated with different values of an embedding. Although FIG. 9 depicts two axes, the content item embeddings (e.g., the image embeddings) may include any number of values that may be represented in a plurality of different dimensional plots.

In particular, FIG. 9 depicts a plurality of black dots that represent example embeddings in an embedding space. The black dots can be associated with different content items (e.g., images, text, video, audio, web pages, etc.). The different content items may be associated with different candidate search results that may be identified during multi-content item search.

Additionally, FIG. 9 depicts a representation of a plurality of learned distributions that are associated with regions in the embedding space that share one or more properties (e.g., each embedding in a region of a learned distribution may share an object of a particular object type, may share an image classification, may share a color and/or pattern, may share an object classification, and/or may share one or more other properties).

For embedding based multi-content item search, a first content item (e.g., a first image) may be processed with an embedding model to generate a first embedding 906, and a second content item (e.g., a second image) may be processed with the embedding model to generate a second embedding 908. The first content item and the second content item may be part of a multi-content item query. The embedding model may have been trained to generate embeddings descriptive of features in the content item. The embedding model may be trained and/or configured to generate embeddings that are similar to embeddings generated based on content items with similar features.

The first embedding 906 and the second embedding 908 can then be utilized to determine one or more search results. The one or more search results can be determined based on other embeddings that are associated with the same learned distribution (e.g., the first learned distribution 910) as the first embedding 906 and the second embedding 908. In some implementations, the first embedding 906 can be associated with features a user requests to be absent, and the second embedding 908 may be associated with features a user is requesting to be identified during search. Therefore, the one or more search results can be based on search result embeddings associated with the second learned distribution 918 and absent from the first learned distribution 910.

The one or more search results may be determined based on an aggregated similarity score between candidate search result embeddings and the embeddings associated with the query (e.g., the first embedding 906 and the second embedding 908). The similarity score may be weighted based on context data associated with the first embedding 906 and the second embedding 908 (e.g., a similarity score with the second embedding 908 may be weighted more heavily due to the second content item associated with the second embedding 908 being interacted with by the user more recently that the first content item associated with the first embedding 906).

In some implementations, a third embedding may be generated and/or determined based on the first embedding 906 and the second embedding 908. The one or more search results can then be determined based on candidate search result embedding similarity with relation to the third embedding.

The third embedding may be an embedding average 912 of the first embedding 906 and the second embedding 908. The embedding average 912 may be a weighted average based on context data, which can include time data, location data, quality data, size data, interaction data, and/or other context data.

Alternatively and/or additionally, the third embedding may be generated based on a request to include details of a first content item associated with the first embedding 906 without the one or more particular details of the second content item associated with the second embedding 908. The third embedding may then be determined and/or generated based on being similar to the first embedding and dissimilar to the second embedding, which may include an embedding that includes an inverse delta from the delta between the first embedding 906 and the second embedding 908.

In some implementations, the third embedding may be a projection embedding 916 that is determined by following the trend provided in a user selecting a first content item associated with the first embedding 906 and then selecting a second content item associated with the second embedding 908. The projection embedding 916 may include a directional projection from the second embedding 908 similar to the directional embedding projection from the first embedding 906 to the second embedding 908. The magnitude of the projection from the second embedding may be similar to the delta the values of the first embedding 906 and the second embedding 908. Alternatively and/or additionally, the magnitude may have a differing proportion (e.g., half the magnitude and/or may be based on a context and/or other trend data).

Figure 10:
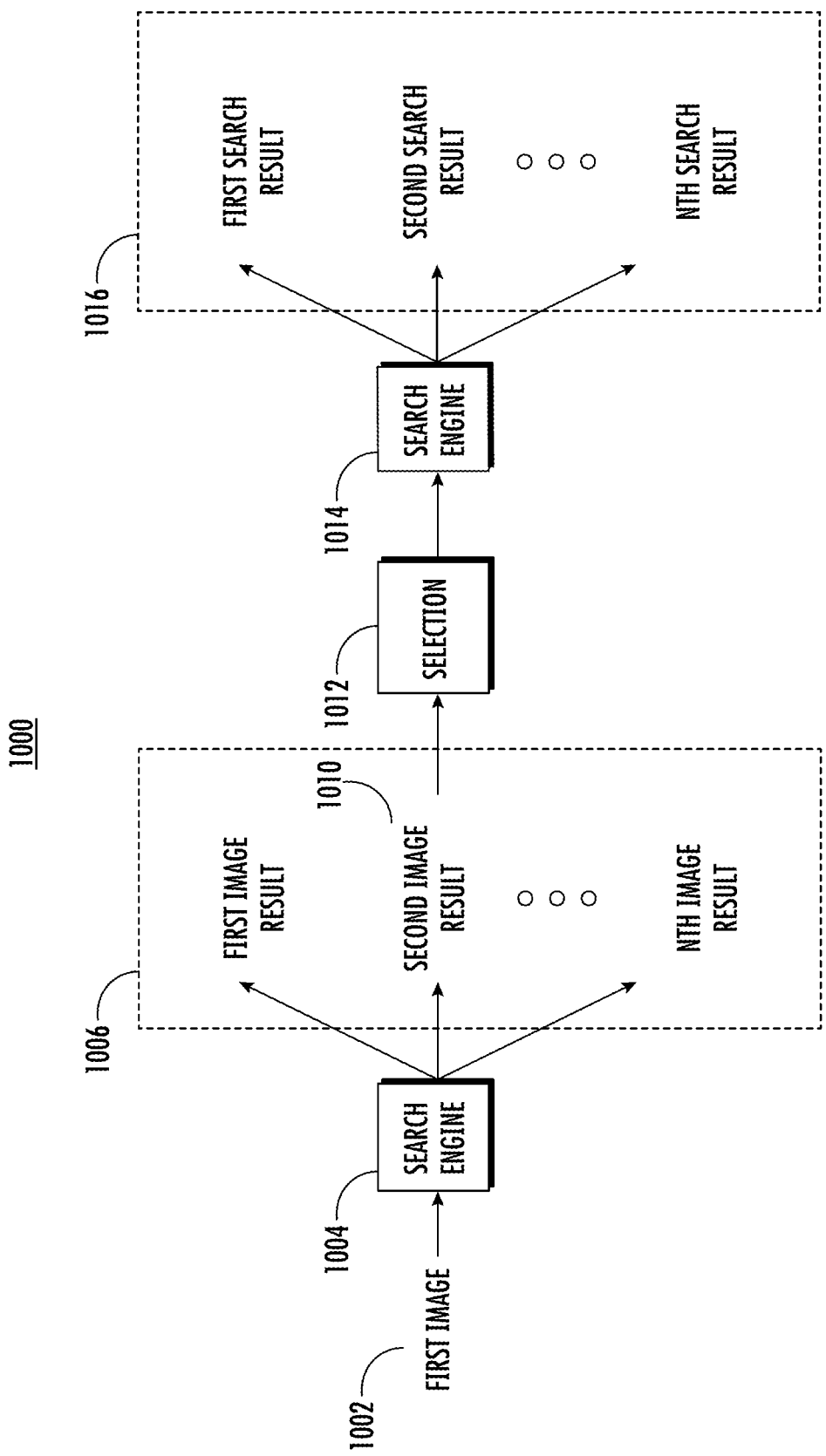
FIG. 10 depicts a block diagram of an example sequential search system according to example embodiments of the present disclosure.

FIG. 10 depicts a block diagram of an example sequential search system 1000 according to example embodiments of the present disclosure. In particular, the sequential search system 100 depicted in FIG. 10 includes a first search instance based on a first image 1002 and a second search instance based on the first image 1002 and a selected second image result 1010 that is a search result responsive to the first search instance.

For example, a first image 1002 can be obtained and processed with a search engine 1004 to determine a first set of search results 1006. The first set of search results 1006 can include a plurality of image search results, which can include a first image result, a second image result 1010, and/or an nth image result. A selection 1012 may be received from a user that selects the second image result 1010. The first image 1002 and the second image result 1010 can be processed with a search engine 1014 to generate a second set of search results 1016, which may include a first search result, a second search result, and/or an nth search result.

The search engine 1004 and the search engine 1014 may be the same search engine and/or may differ. The second set of search results 1016 may include one or more search results of the first set of search results 1006. In some implementations, the second set of search results 1016 may include the first set of search results 1006 re-ranked and/or refined based on the selected second image result 1010. Alternatively and/or additionally, the second set of search results 1016 may include different search results from the first set of search results 1006. In determining the second set of search results 1016, a high-level of association with the second image result 1010 may receive heavier weighting than a high-level of association with the first image 1002.

In some implementations, the second image result 1010 may be selected as an example of one or more details the user requests to be absent from the search results, and the second set of search results 1016 may include search results associated with content items that are associated with the first image 1002 and includes an absence of the particular detail of the second image result 1010. Alternatively and/or additionally, the second image result 1010 may be selected as including one or more particular details the user is requesting. The second set of search results 1016 may then be determined based on search results that are similar to the first image 1002 and include the particular detail of the second image result 1010.

In some implementations, the first image 1002 and/or the second image result 1010 may be cropped before being processed with a search engine. The cropping may be performed based on a user input and/or may be performed based on an automated determination.

FIG. 11 depicts an illustration of an example guided search system 1100 according to example embodiments of the present disclosure. In particular, a user may input a first image query and may be provided with a first search results interface 1102 based on the first image query. The first search results interface 1102 can include a plurality of search results responsive to the first image query.

A user may select a user interface element in the first search results interface 1102 that causes a "guide your search" interface 1104 to be provided to the user. The "guide your search" interface 1104 can include options for altering the first image query and/or generating (and/or selecting) a second image query to generate a multi-image search query. The "guide your search" interface 1104 can include a plurality of object alteration options for selection. The object alteration options can include altered and/or augmented versions of an object depicted in the first image query. The object alteration options may be determined based on identifying other objects of the same object type as the object in the first image query. Alternatively and/or additionally, the object alteration objects may be generated based on instance interpolation, image augmentation, and/or generative model processing.

A user may select a particular object alteration option, which can cause a cropping interface 1106 to be provided for display to allow a user to crop the selected image option before the selected option is searched. The selected option may be searched with the first image query, and/or the selected object alteration option may be utilized to re-rank and/or refine the search results in the first search results interface 1102.

Figure 12A:
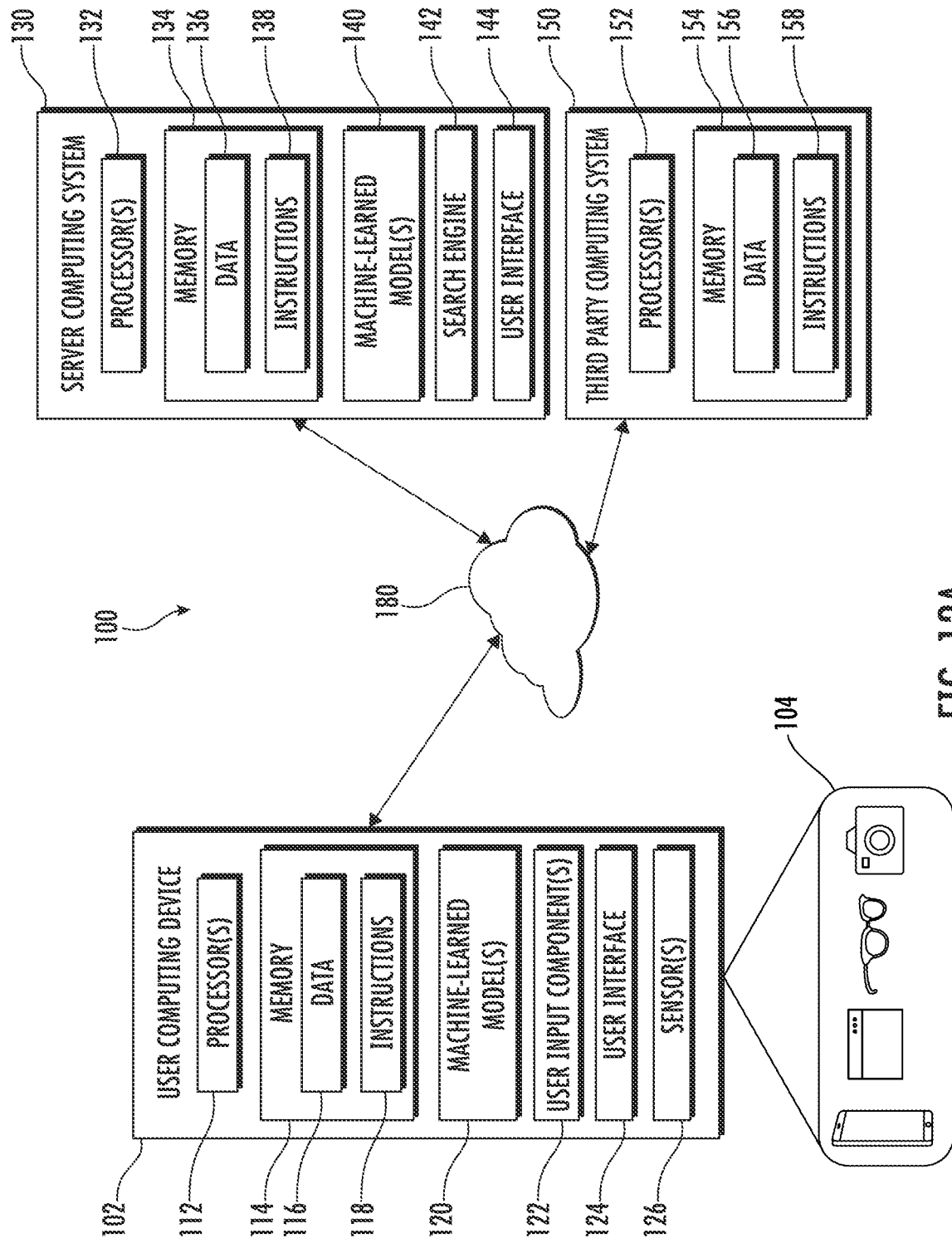
FIG. 12A depicts a block diagram of an example computing system that performs multi-image search according to example embodiments of the present disclosure.

FIG. 12A depicts a block diagram of an example computing system 100 that performs multi-image search according to example embodiments of the present disclosure. The system 100 includes a user computing system 102, a server computing system 130, and/or a third computing system 150 that are communicatively coupled over a network 180.

The user computing system 102 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected.

The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing system 102 to perform operations.

In some implementations, the user computing system 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing system 102 can implement multiple parallel instances of a single machine-learned model 120 (e.g., to perform parallel machine-learned model processing across multiple instances of input data and/or detected features).

More particularly, the one or more machine-learned models 120 may include one or more detection models, one or more classification models, one or more segmentation models, one or more augmentation models, one or more generative models, one or more natural language processing models, one or more optical character recognition models, and/or one or more other machine-learned models. The one or more machine-learned models 120 can include one or more transformer models. The one or more machine-learned models 120 may include one or more neural radiance field models, one or more diffusion models, and/or one or more autoregressive language models.

The one or more machine-learned models 120 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 120 can process image data, text data, audio data, and/or latent encoding data to generate output data that can include image data, text data, audio data, and/or latent encoding data. The one or more machine-learned models 120 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Additionally or alternatively, one or more machine-learned models 140 can be included in or otherwise stored and implemented by the server computing system 130 that communicates with the user computing system 102 according to a client-server relationship. For example, the machine-learned models 140 can be implemented by the server computing system 140 as a portion of a web service (e.g., a viewfinder service, a visual search service, an image processing service, an ambient computing service, and/or an overlay application service). Thus, one or more models 120 can be stored and implemented at the user computing system 102 and/or one or more models 140 can be stored and implemented at the server computing system 130.

The user computing system 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system can store and/or provide one or more user interfaces 124, which may be associated with one or more applications. The one or more user interfaces 124 can be configured to receive inputs and/or provide data for display (e.g., image data, text data, audio data, one or more user interface elements, an augmented-reality experience, a virtual reality experience, and/or other data for display. The user interfaces 124 may be associated with one or more other computing systems (e.g., server computing system 130 and/or third party computing system 150). The user interfaces 124 can include a viewfinder interface, a search interface, a generative model interface, a social media interface, and/or a media content gallery interface.

The user computing system 102 may include and/or receive data from one or more sensors 126. The one or more sensors 126 may be housed in a housing component that houses the one or more processors 112, the memory 114, and/or one or more hardware components, which may store, and/or cause to perform, one or more software packets. The one or more sensors 126 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 102 may include, and/or pe part of, a user computing device 104. The user computing device 104 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more one or more user computing devices 104. For example, a camera of a smartphone may be utilized to capture image data descriptive of the environment, and/or an overlay application of the user computing device 104 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 9B.

Additionally and/or alternatively, the server computing system 130 can include and/or be communicatively connected with a search engine 142 that may be utilized to crawl one or more databases (and/or resources). The search engine 142 can process data from the user computing system 102, the server computing system 130, and/or the third party computing system 150 to determine one or more search results associated with the input data. The search engine 142 may perform term based search, label based search, Boolean based searches, image search, embedding based search (e.g., nearest neighbor search), multimodal search, and/or one or more other search techniques.

The server computing system 130 may store and/or provide one or more user interfaces 144 for obtaining input data and/or providing output data to one or more users. The one or more user interfaces 144 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 102 and/or the server computing system 130 can train the models 120 and/or 140 via interaction with the third party computing system 150 that is communicatively coupled over the network 180. The third party computing system 150 can be separate from the server computing system 130 or can be a portion of the server computing system 130. Alternatively and/or additionally, the third party computing system 150 may be associated with one or more web resources, one or more web platforms, one or more other users, and/or one or more contexts.

The third party computing system 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the third party computing system 150 to perform operations. In some implementations, the third party computing system 150 includes or is otherwise implemented by one or more server computing devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP. SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s)

can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 102 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing system 100.

The central intelligence layer can communicate with a central device data layer. The central device data layer can be a centralized repository of data for the computing system 100. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 12B:
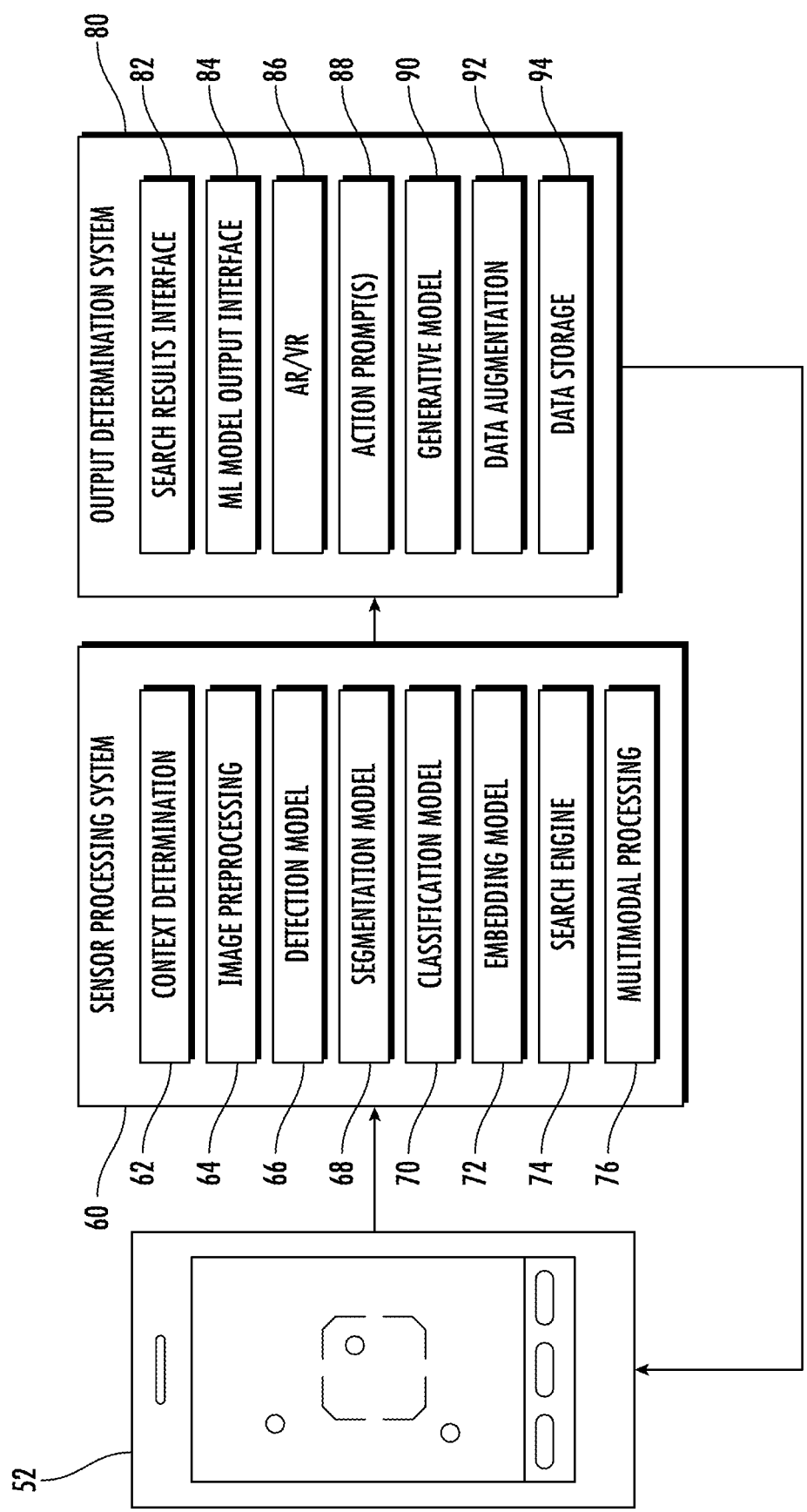
FIG. 12B depicts a block diagram of an example computing system that performs multi-image search according to example embodiments of the present disclosure.

FIG. 12B depicts a block diagram of an example computing system 50 that performs multi-image search according to example embodiments of the present disclosure. In particular, the example computing system 50 can include one or more computing devices 52 that can be utilized to obtain, and/or generate, one or more datasets that can be processed by a sensor processing system 60 and/or an output determination system 80 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 52 (e.g., one or more sensors in the computing device 52). Additionally and/or alternatively, the one or more datasets can be stored data and/or retrieved data (e.g., data retrieved from a web resource). For example, images, text, and/or other content items may be interacted with by a user. The interacted with content items can then be utilized to generate one or more determinations.

The one or more computing devices 52 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 60. The sensor processing system 60 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 62, which may determine a context associated with one or more content items. The context determination block 62 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 60 may include an image preprocessing block 64. The image preprocessing block 64 may be utilized to adjust one or more values of an obtained and/or received image to prepare the image to be processed by one or more machine-learned models and/or one or more search engines 74. The image preprocessing block 64 may resize the image, adjust saturation values, adjust resolution, strip and/or add metadata, and/or perform one or more other operations.

In some implementations, the sensor processing system 60 can include one or more machine-learned models, which may include a detection model 66, a segmentation model 68, a classification model 70, an embedding model 72, and/or one or more other machine-learned models. For example, the sensor processing system 60 may include one or more detection models 66 that can be utilized to detect particular features in the processed dataset. In particular, one or more images can be processed with the one or more detection models 66 to generate one or more bounding boxes associated with detected features in the one or more images.

Additionally and/or alternatively, one or more segmentation models 68 can be utilized to segment one or more portions of the dataset from the one or more datasets. For example, the one or more segmentation models 68 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 70 can be utilized to process image data, text data, audio data, latent encoding data, multimodal data, and/or other data to generate one or more classifications. The one or more classification models 70 can include one or more image classification models, one or more object classification models, one or more text classification models, one or more audio classification models, and/or one or more other classification models. The one or more classification models 70 can process data to determine one or more classifications.

In some implementations, data may be processed with one or more embedding models 72 to generate one or more embeddings. For example, one or more images can be processed with the one or more embedding models 72 to generate one or more image embeddings in an embedding space. The one or more image embeddings may be associated with one or more image features of the one or more images. In some implementations, the one or more embedding models 72 may be configured to process multimodal data to generate multimodal embeddings. The one or more embeddings can be utilized for classification, search, and/or learning embedding space distributions.

The sensor processing system 60 may include one or more search engines 74 that can be utilized to perform one or more searches. The one or more search engines 74 may crawl one or more databases (e.g., one or more local databases, one or more global databases, one or more private databases, one or more public databases, one or more specialized databases, and/or one or more general databases) to determine one or more search results. The one or more search engines 74 may perform feature matching, text based search, embedding based search (e.g., k-nearest neighbor search), metadata based search, multimodal search, web resource search, image search, text search, and/or application search.

Additionally and/or alternatively, the sensor processing system 60 may include one or more multimodal processing blocks 76, which can be utilized to aid in the processing of multimodal data. The one or more multimodal processing blocks 76 may include generating a multimodal query and/or a multimodal embedding to be processed by one or more machine-learned models and/or one or more search engines 74.

The output(s) of the sensor processing system 60 can then be processed with an output determination system 80 to determine one or more outputs to provide to a user. The output determination system 80 may include heuristic based determinations, machine-learned model based determinations, user selection based determinations, and/or context based determinations.

The output determination system 80 may determine how and/or where to provide the one or more search results in a search results interface 82. Additionally and/or alternatively, the output determination system 80 may determine how and/or where to provide the one or more machine-learned model outputs in a machine-learned model output interface 84. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 60 may be utilized to generate and/or provide an augmented-reality experience and/or a virtual-reality experience 86. For example, the one or more obtained datasets may be processed to generate one or more augmented-reality rendering assets and/or one or more virtual-reality rendering assets, which can then be utilized to provide an augmented-reality experience and/or a virtual-reality experience 86 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 88 may be determined based on the output(s) of the sensor processing system 60. For example, a search prompt, a purchase prompt, a generate prompt, a reservation prompt, a call prompt, a redirect prompt, and/or one or more other prompts may be determined to be associated with the output(s) of the sensor processing system 60. The one or more action prompts 88 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 60 may be processed with one or more generative models 90 to generate a model-generated content item that can then be provided to a user. The generation may be prompted based on a user selection and/or may be automatically performed (e.g., automatically performed based on one or more conditions, which may be associated with a threshold amount of search results not being identified).

The output determination system 80 may process the one or more datasets and/or the output(s) of the sensor processing system 60 with a data augmentation block 92 to generate augmented data. For example, one or more images can be processed with the data augmentation block 92 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 60 may be stored based on a data storage block 94 determination.

The output(s) of the output determination system 80 can then be provided to a user via one or more output components of the user computing device 52. For example, one or more user interface elements associated with the one or more outputs can be provided for display via a visual display of the user computing device 52.

The processes may be performed iteratively and/or continuously. One or more user inputs to provided user interface elements may condition and/or affect successive processing loops.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for searching with multiple images, the system comprising:
   one or more processors; and
   one or more non-transitory computer-readable media that collectively store instructions that, when executed by the one or more processors, cause the computing system to perform operations, the operations comprising:
      obtaining a search query, wherein the search query comprises a first image and a second image;
      processing the first image and the second image to determine one or more shared attributes, wherein the first image is associated with the one or more shared attributes, and wherein the second image is associated with the one or more shared attributes;
      processing the first image with an embedding model to generate a first embedding, wherein the first embedding is associated with an embedding space;
      processing the second image with the embedding model to generate a second embedding, wherein the second embedding is associated with the embedding space;
      determining a third embedding based on the first embedding, the second embedding, and a determination that a first user interaction time associated with inputting the first image is earlier than a second user interaction time associated with inputting the second image;
      determining one or more search results based at least in part on the one or more shared attributes and the third embedding, wherein the one or more search results are determined to be associated with the one or more shared attributes and the third embedding; and
      providing the one or more search results in a search results interface.

2. The system of claim 1, wherein the one or more shared attributes comprise one or more text labels.

3. The system of claim 2, wherein the one or more text labels are obtained from a web resource associated with at least one of the first image or the second image.

4. The system of claim 2, wherein the one or more text labels are determined based on first metadata for the first image and second metadata for the second image.

5. The system of claim 2, wherein the search results interface comprises one or more user interface elements comprising one or more words descriptive of the one or more text labels.

6. The system of claim 5, wherein the operations further comprise:
obtaining a selection of a particular user interface element of the one or more user interface elements;
obtaining one or more additional search results based on a particular text label associated with the particular user interface element; and
providing the one or more additional search results for display in the search results interface.

7. The system of claim 1, wherein processing the first image and the second image to determine one or more shared attributes comprises:
processing the first image and the second image with one or more machine-learned models to determine one or more matching visual features, wherein the one or more shared attributes comprise one or more matching visual features.

8. The system of claim 1, wherein processing the first image and the second image to determine one or more shared attributes comprises:
processing the first image with one or more classification models to determine a first set of classifications, wherein the first set of classifications comprise one or more first object classifications;
processing the second image with the one or more classification models to determine a second set of classifications, wherein the second set of classifications comprise one or more second object classifications; and
comparing the first set of classifications and the second set of classifications to determine one or more similar classifications, wherein the one or more shared attributes are associated with the one or more similar classifications.

9. The system of claim 1, wherein the operations further comprise:
obtaining a user input that selects a portion of the first image;
generating an augmented first image, wherein the first augmented image is generated by cropping the first image based on the user input; and
wherein the one or more search results are determined based at least in part on the augmented first image.

10. The system of claim 1, wherein the operations further comprise:
obtaining a user input that selects a portion of the second image;
generating an augmented second image, wherein the second augmented image is generated by:
generating one or more segmentation masks based on the user input;
segmenting one or more regions of the second image based on the one or more segmentation masks; and
wherein the one or more search results are determined based at least in part on the augmented second image.

11. A computer-implemented method for searching with multiple images, the method comprising:
obtaining, by a computing system comprising one or more processors, a first image and a second image;
processing, by the computing system, the first image with an embedding model to generate a first embedding, wherein the first embedding is associated with an embedding space;
processing, by the computing system, the second image with the embedding model to generate a second embedding, wherein the second embedding is associated with the embedding space;
obtaining, by the computing system, first time data associated with the first image and second time data associated with the second image, wherein the first time data is descriptive of a first user interaction time with the first image, and wherein the second time data is descriptive of a second user interaction time with the second image;
determining, by the computing system, the first user interaction time is earlier than the second user interaction time;
determining, by the computing system, a third embedding based on the first embedding, the second embedding, and the determination that the first user interaction time is earlier than the second user interaction time;
determining, by the computing system, one or more search results based on the first embedding and the second embedding, wherein the one or more search results are associated with one or more search result embeddings, wherein determining, by the computing system, the one or more search results based on the first embedding and the second embedding, comprises:
determining, by the computing system, the one or more search results embeddings are associated with the third embedding; and
providing, by the computing system, the one or more search results for display in a search results interface.

12. The method of claim 11, wherein the third embedding is determined based on a determined projection from the first embedding to the second embedding, wherein the third embedding is associated with a continuation of the determined projection.

13. The method of claim 12, further comprising:
determining, by the computing system, an average embedding based on an average of the first embedding and the second embedding; and
wherein determining, by the computing system, the one or more search results based on the first embedding and the second embedding, comprises:
determining, by the computing system, one or more additional search results embeddings are associated with the average embedding.

14. The method of claim 13, wherein the average embedding is generated based on a weighted average of the first embedding and the second embedding, wherein one or more weights for the weighted average is determined based on context data associated with at least one of the first image or the second image.

15. The method of claim 14, wherein the context data comprises time data associated with a respective first time associated with the first image and a respective second time associated with the second image.

16. One or more non-transitory computer-readable media that collectively store instructions that, when executed by one or more computing devices, cause the one or more computing devices to perform operations, the operations comprising:

obtaining a first image query, wherein the first image query comprises first image data;

determining a first set of search results based on the first image data, wherein the first set of search results comprises a plurality of first image search results;

providing the first set of search results for display in a search results interface;

obtaining a selection of a particular first image search result of the plurality of first image search results, wherein the particular first image search result is associated with second image data, wherein the first image data and the second image data differ;

processing the first image data with an embedding model to generate a first embedding, wherein the first embedding is associated with an embedding space;

processing the second image data with the embedding model to generate a second embedding, wherein the second embedding is associated with the embedding space;

determining a third embedding based on the first embedding, the second embedding, and a determination that a first user interaction time associated with the first image query is earlier than a second user interaction time associated with the selection of the particular first image search result of the plurality of first image search results;

determining a second set of search results based on the third embedding; and providing the second set of search results for display in the search results interface.

17. The one or more non-transitory computer-readable media of claim 16, wherein the selection is associated with a request for an absence of one or more particular details, wherein the second image data comprises the one or more particular details; and wherein the second set of search results are descriptive of a plurality of second image search results that comprise one or more objects associated with the first image data without the one or more particular details of the second image data.

18. The one or more non-transitory computer-readable media of claim 16, wherein the second set of search results are determined based on a particular attribute, wherein the first image data is descriptive of the particular attribute, and wherein the second image data is descriptive of the particular attribute.

19. The one or more non-transitory computer-readable media of claim 18, wherein the particular attribute comprises one or more visual features.

\* \* \* \* \*